United States Patent [19]

Brass et al.

[11] Patent Number: 4,692,603
[45] Date of Patent: Sep. 8, 1987

[54] OPTICAL READER FOR PRINTED BIT-ENCODED DATA AND METHOD OF READING SAME

[75] Inventors: Robert L. Brass, Westport; John Glaberson, Stratford; Richard W. Mason, Cos Cob; Arthur J. L'Heureux, III, Bethel; Scott Santulli, Danbury; G. Thomas Roth, Fairfield, all of Conn.; John Frega, Holmdel; Henry S. Imiolek, Clark, both of N.J.

[73] Assignee: Cauzin Systems, Incorporated, Waterbury, Conn.

[21] Appl. No.: 718,219

[22] Filed: Apr. 1, 1985

[51] Int. Cl.[4] .............................................. G06K 7/10
[52] U.S. Cl. .................................... 235/454; 235/467; 235/470; 235/482; 235/494; 250/236; 250/568; 356/71
[58] Field of Search .............. 235/467, 470, 454, 494, 235/436, 474, 482, 475, 479, 480; 250/236, 568; 356/71

[56] References Cited

U.S. PATENT DOCUMENTS

| | | | |
|---|---|---|---|
| 3,634,696 | 1/1972 | Wildhaber | 250/219 D |
| 3,660,641 | 5/1972 | Levasseur | 235/494 |
| 3,689,744 | 9/1972 | Wildhaber | 235/470 X |
| 3,745,351 | 7/1973 | Pudel | 235/470 X |
| 3,746,868 | 7/1973 | Plockl | 235/470 X |
| 3,758,783 | 9/1973 | Sick et al. | 235/470 X |
| 3,778,129 | 12/1973 | Wildhaber | 350/6 |
| 3,809,894 | 5/1974 | Renzo | 250/236 |
| 3,845,279 | 10/1974 | Rosdorff | 235/494 |
| 4,263,504 | 4/1981 | Thomas | 235/454 |
| 4,409,469 | 10/1983 | Yasuda et al. | 235/463 |
| 4,521,678 | 6/1985 | Winter | 235/472 |
| 4,587,411 | 5/1986 | Obstfelder et al. | 235/475 X |
| 4,620,768 | 11/1986 | Tatsuno et al. | 350/6.8 |

Primary Examiner—David L. Trafton
Attorney, Agent, or Firm—Haynes N. Johnson

[57] ABSTRACT

An apparatus and method are provided for reading contiguous, conterminous, parallel data lines (76) of minute, rectangular bits of information printed on a substrate (2) and together forming a data strip (3) with its length, perpendicular to the data lines (76).

The reader (1) includes alignment means for holding the strip (5) and includes data line scanning means (33, 40, 130) on a chassis (20) which moves longitudinally of the data strip (3) while simultaneously and synchronously scanning the tranverse data lines (76) at a rate that scans each data line a plurality of times. An infra-red light source (50) illuminates the data line (76) being scanned, and crossed cylindrical lenses (30, 32, 40, 130), moving relative to each other and to the data strip (3), focus individual scanned bits upon a matched infra-red detector (42).

Multiples (33) of one of the cylindrical lenses, mounted on a rotating drum (44), are used to increase speed of operation.

Means are provided for continuously aligning the lenses with the data strip (144, 170), for synchronizing the relative motion of the lenses and the data strip (44, 27, 28, 24), for correlating the scanning means with the size and number of bits of information and with the ratio of the illumination intensity of the printed bits and the substrate (74, 80), and for utilizing a single scan from each multiply-scanned data line (76).

70 Claims, 52 Drawing Figures

U.S. Patent  Sep. 8, 1987  Sheet 2 of 22  4,692,603
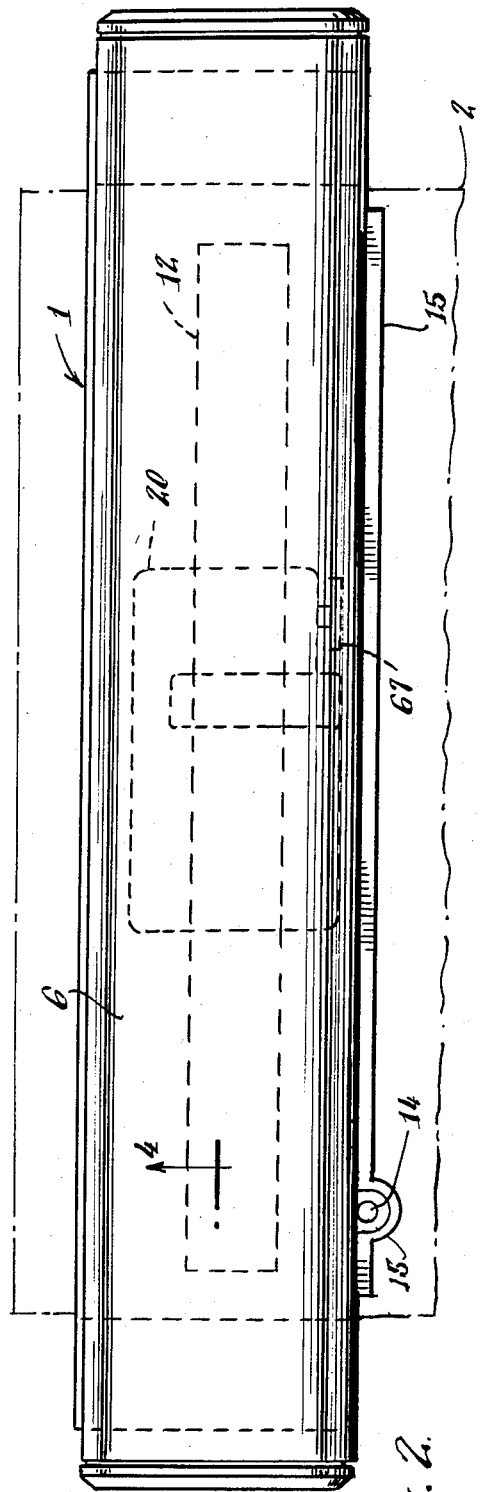
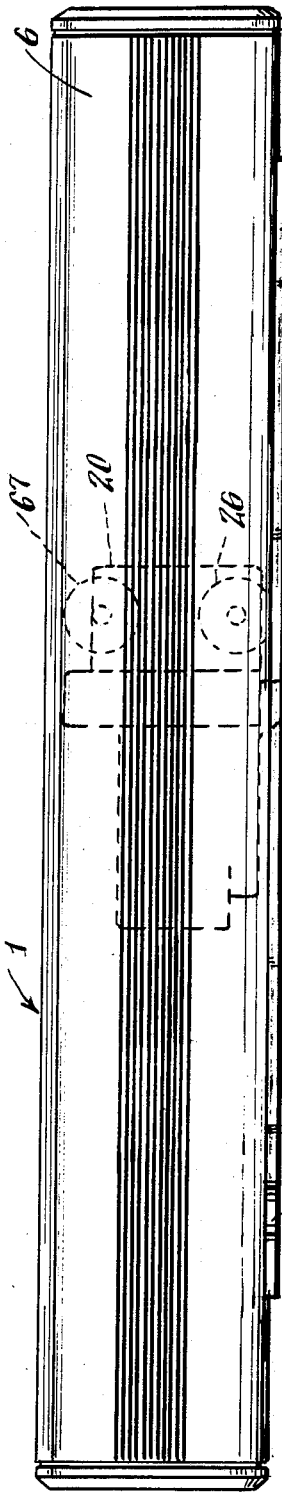
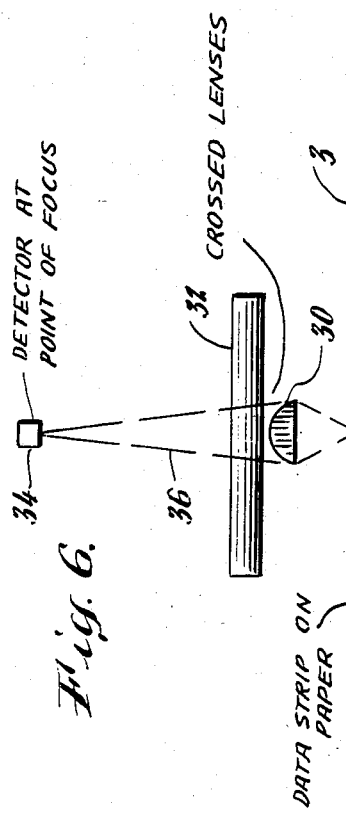

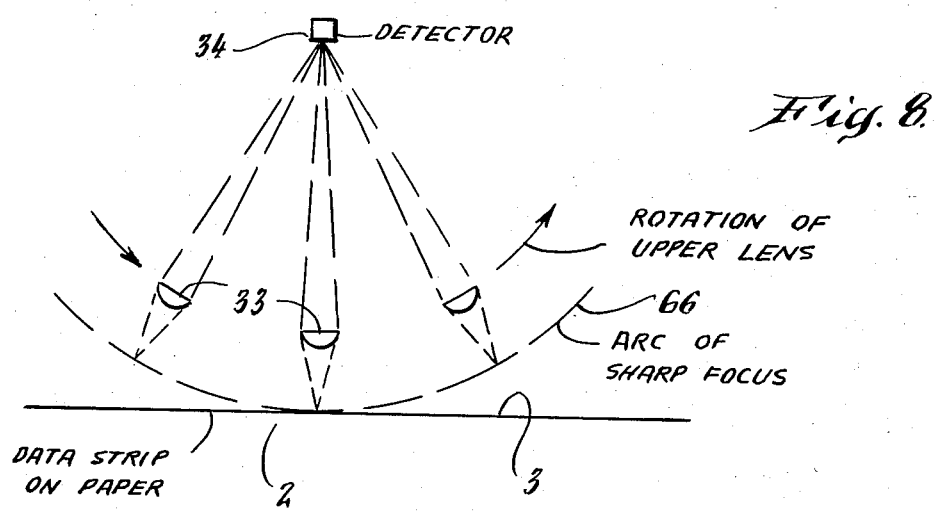
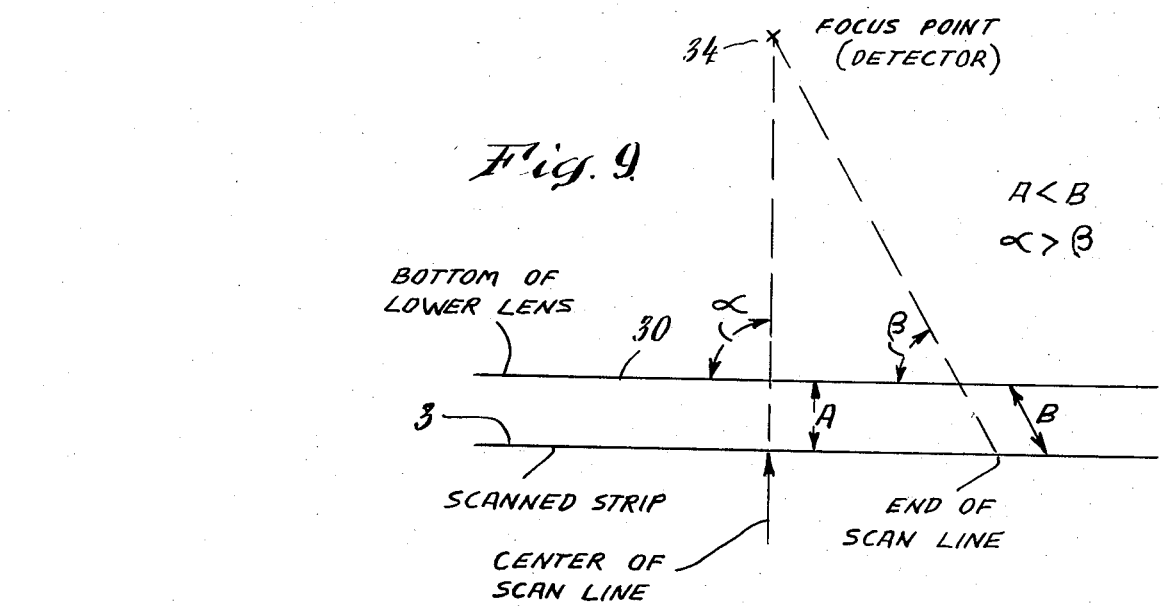
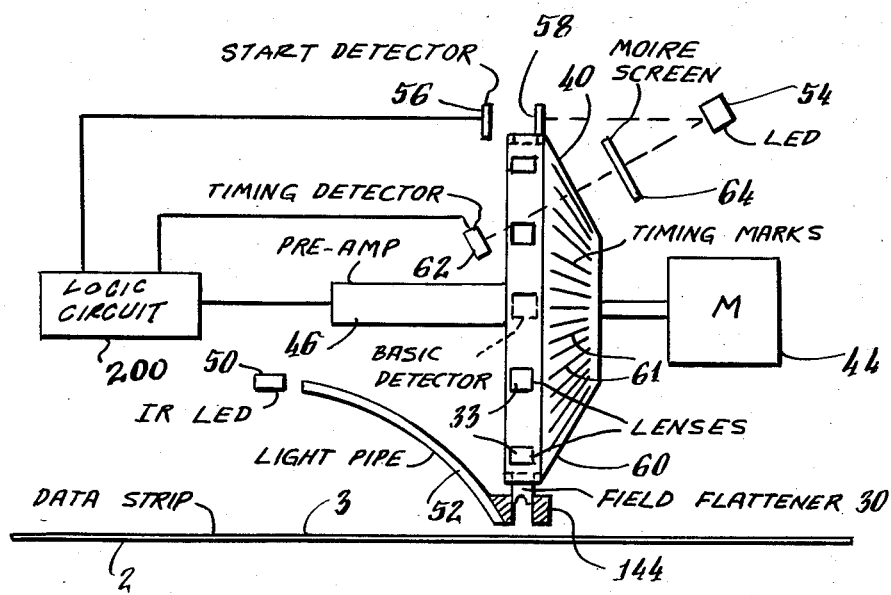

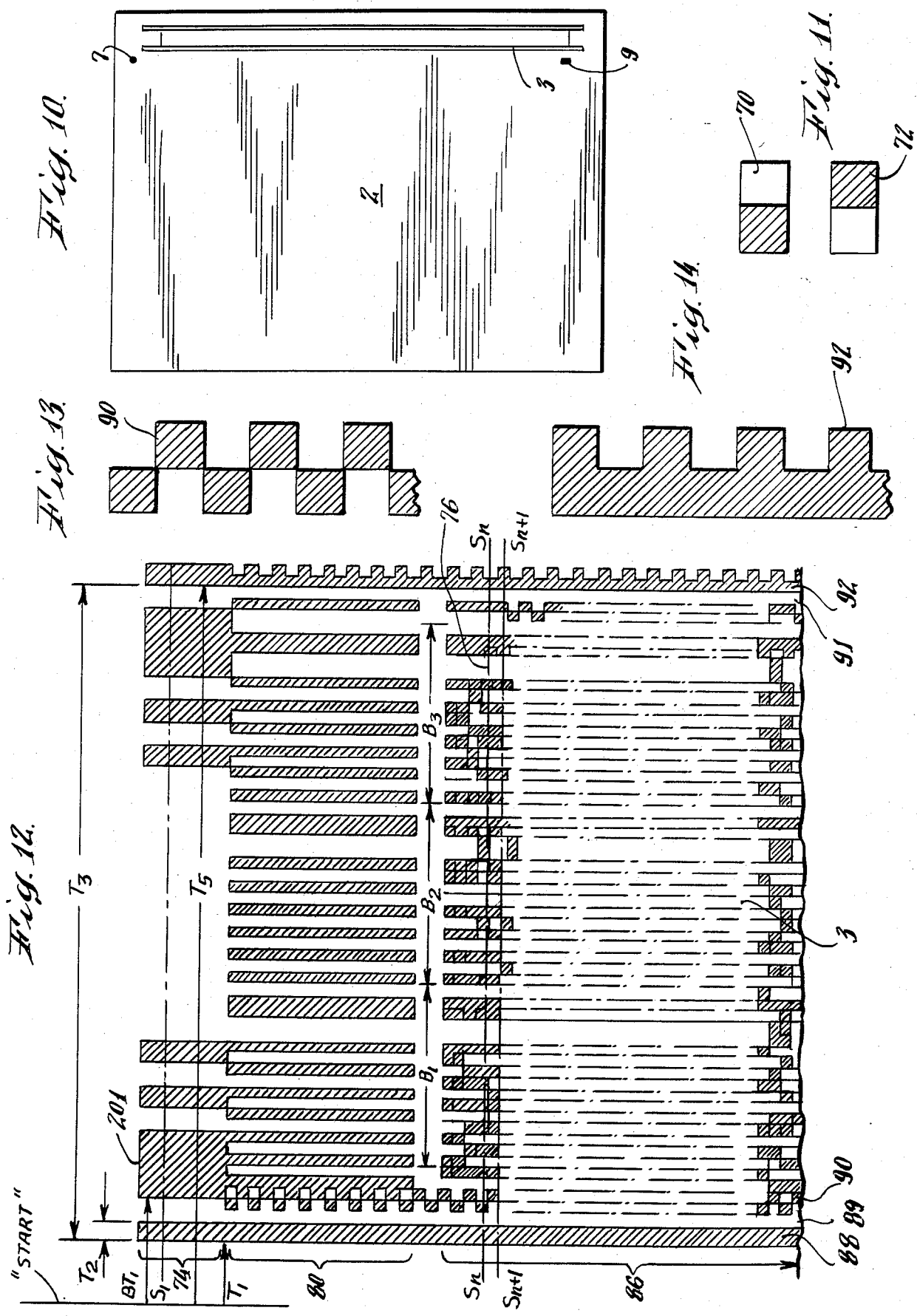

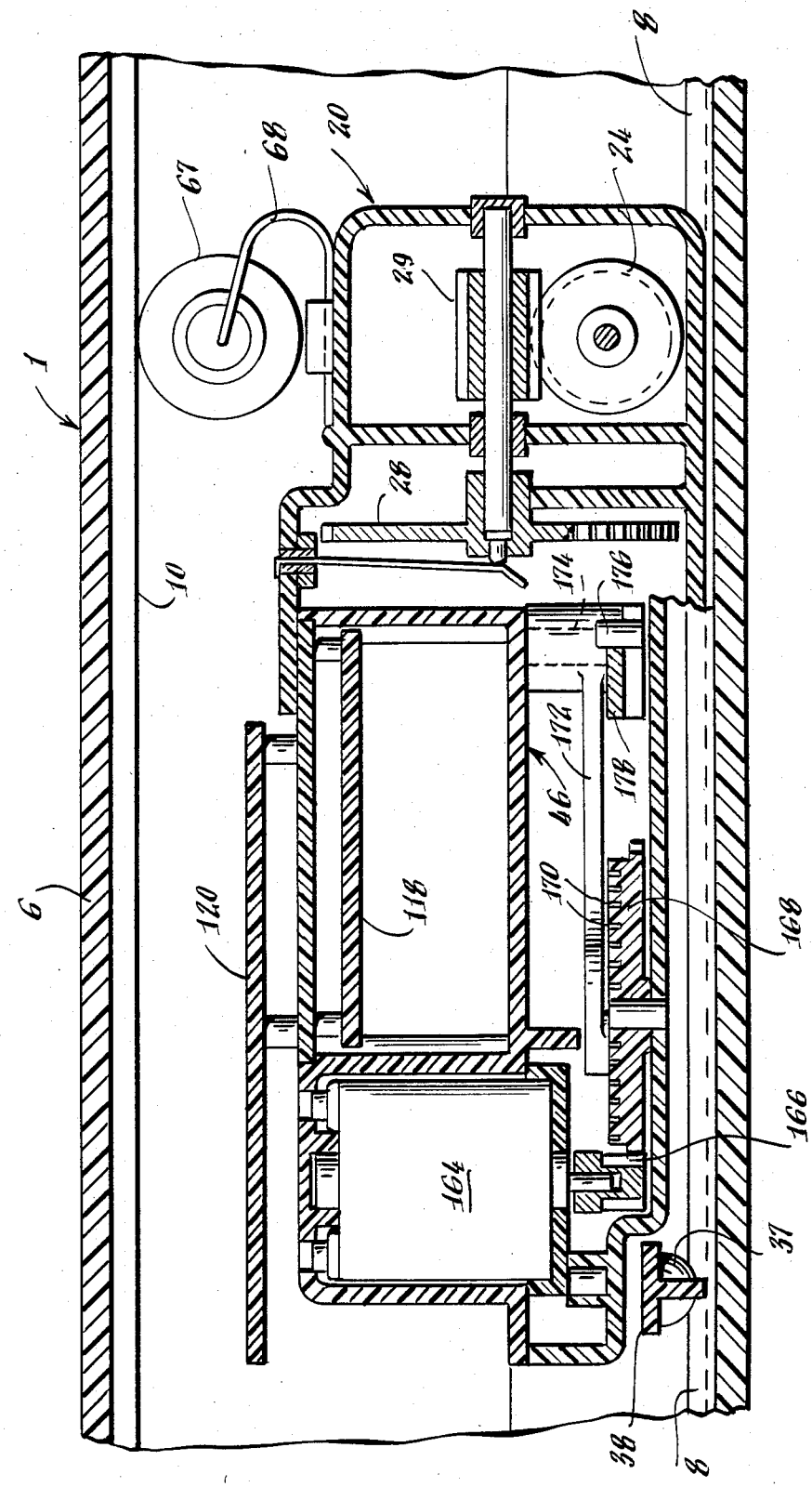

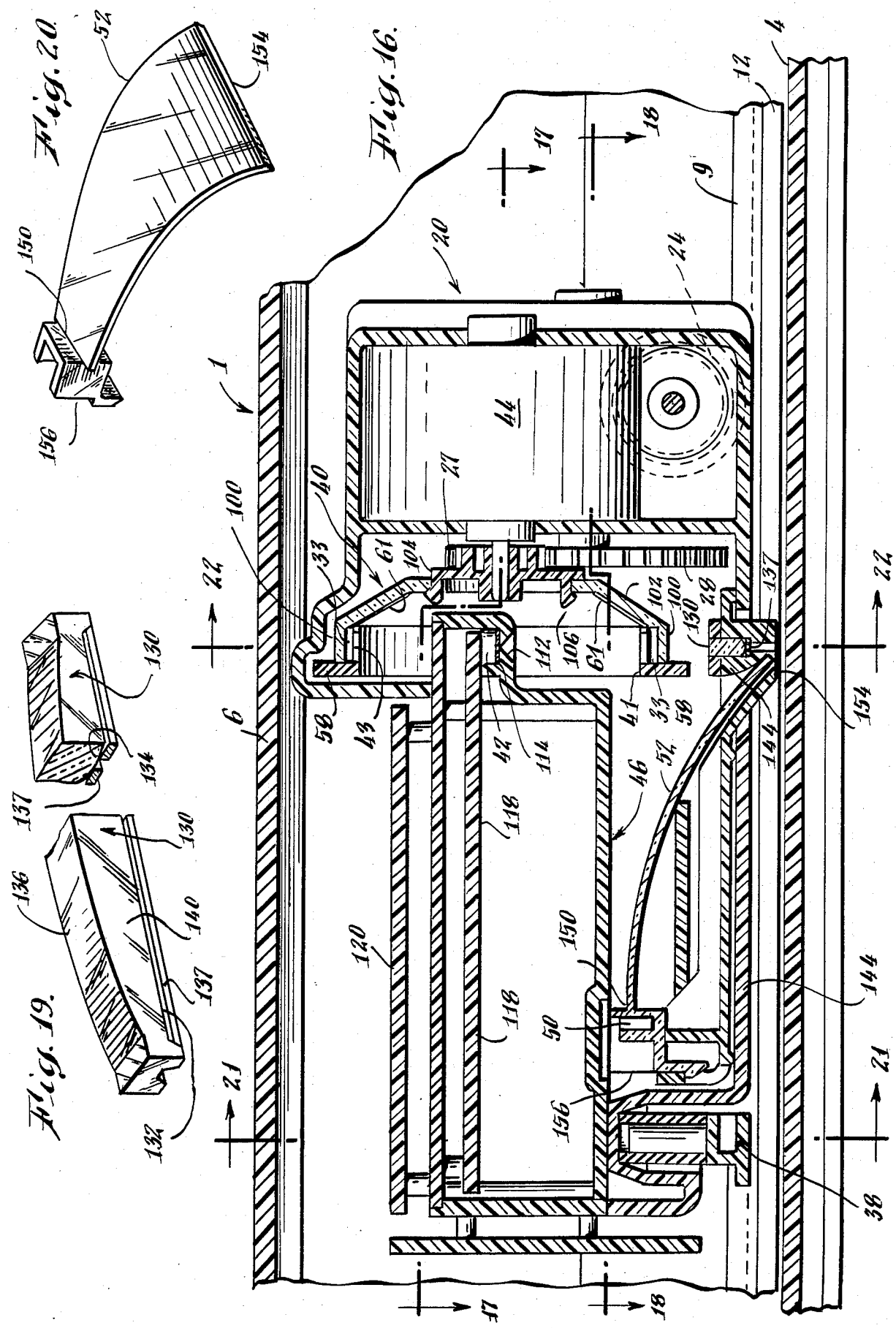

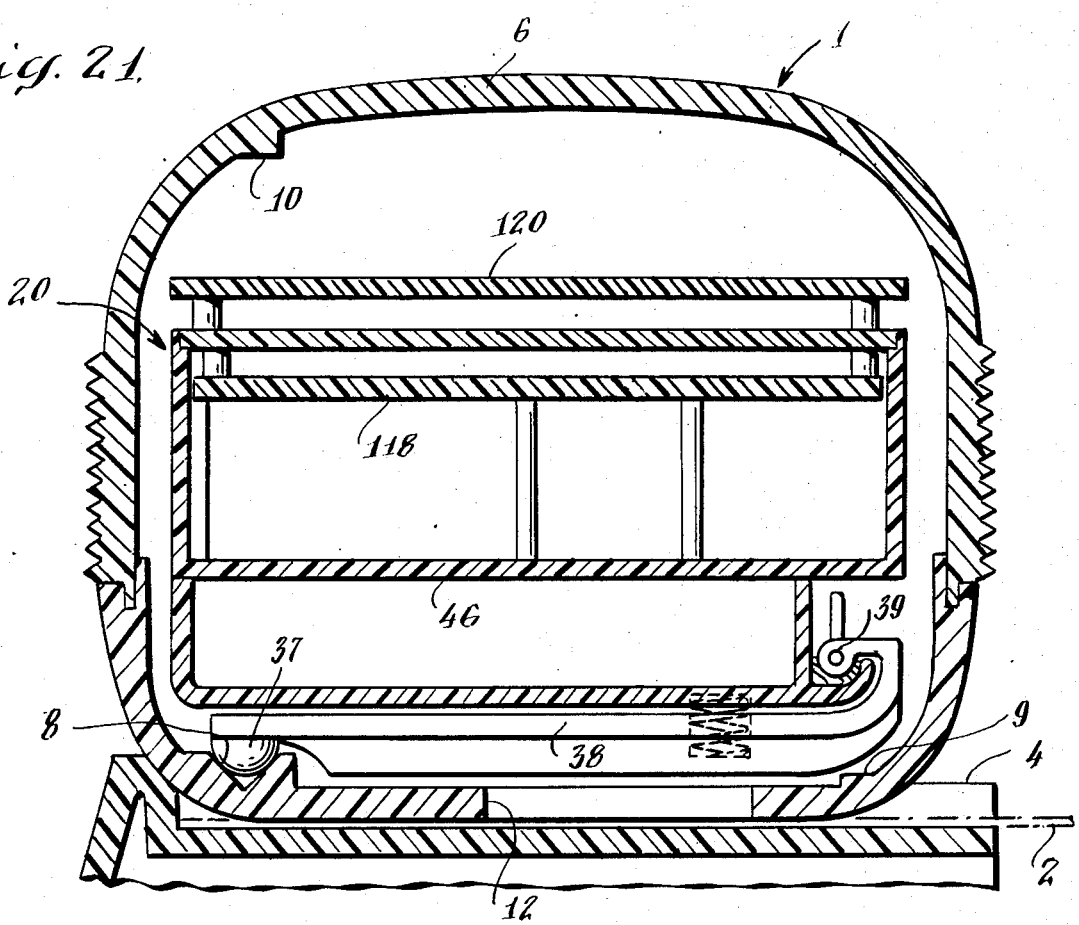
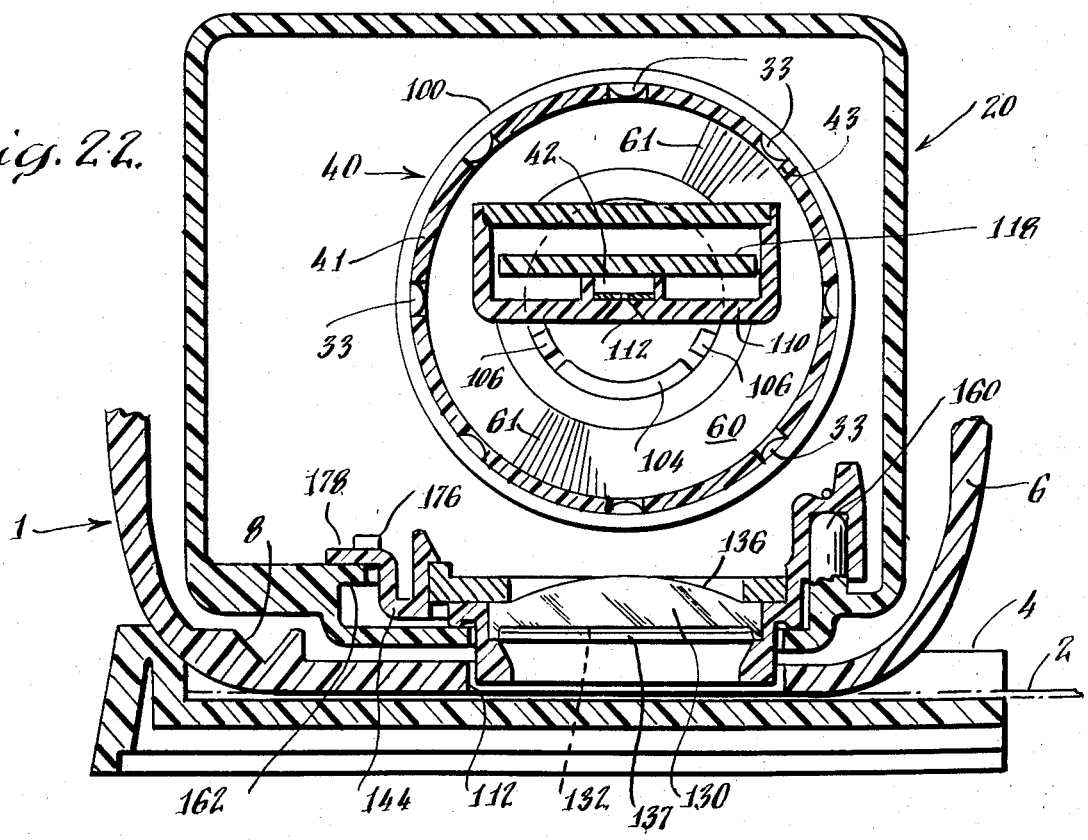

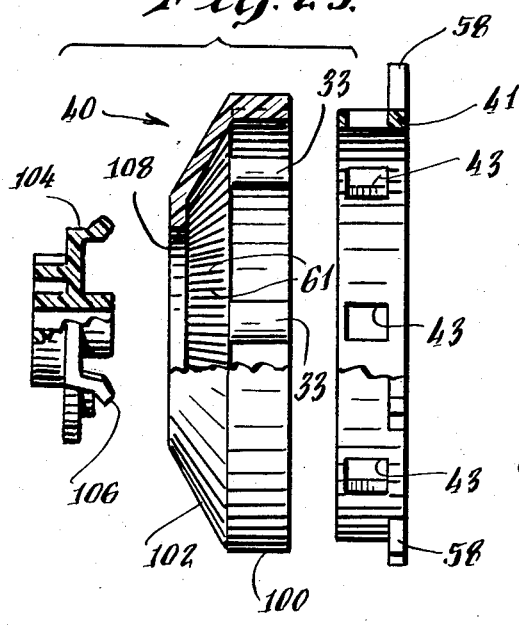
Fig. 23.
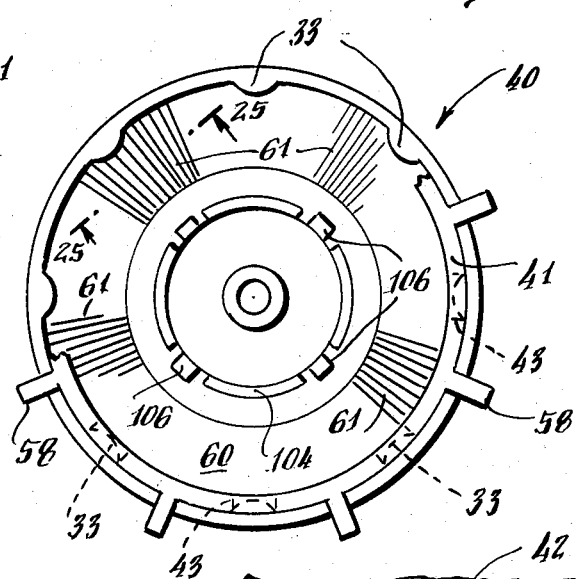
Fig. 24.
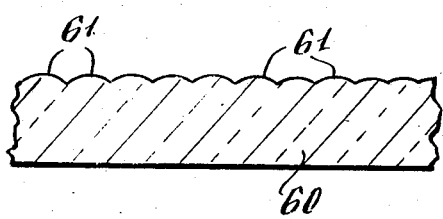
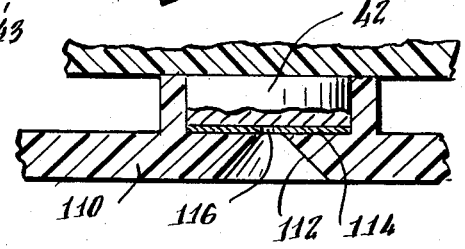
Fig. 26.
Fig. 25.
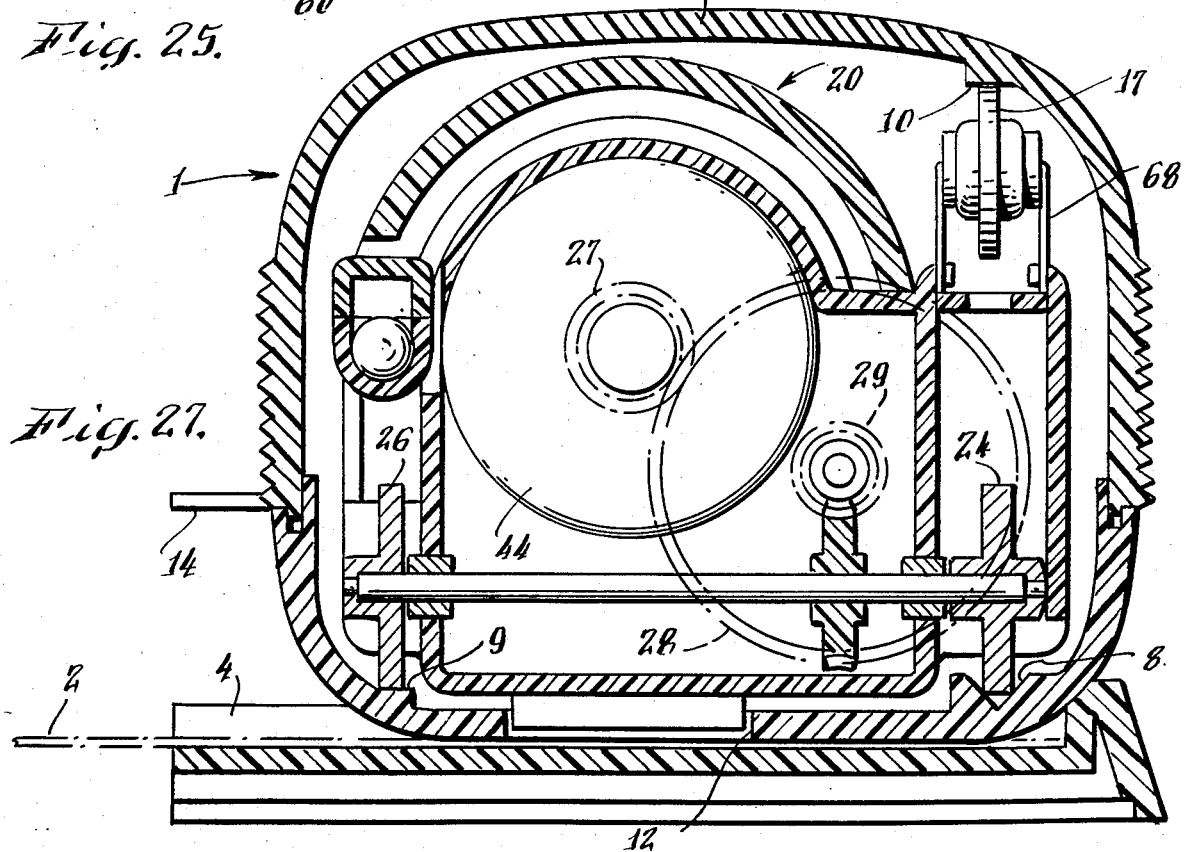
Fig. 27.

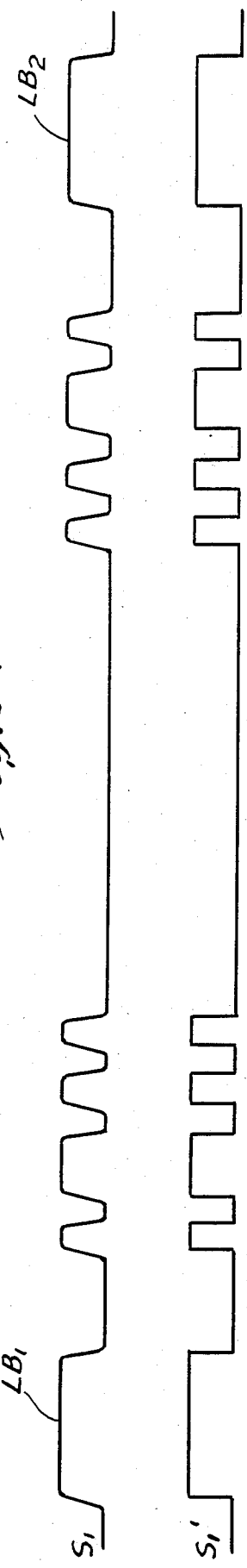
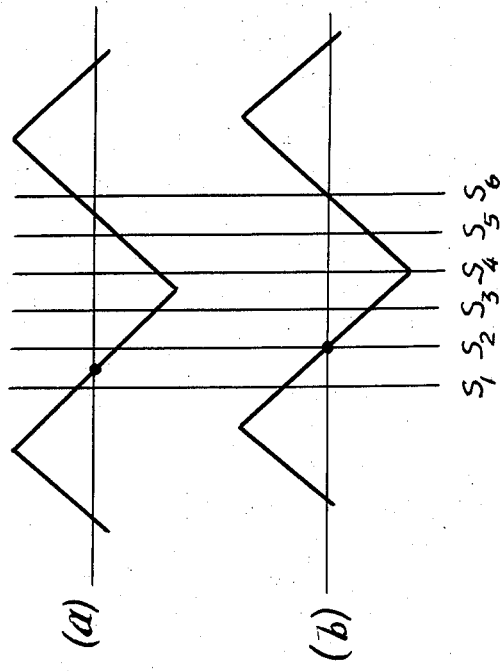
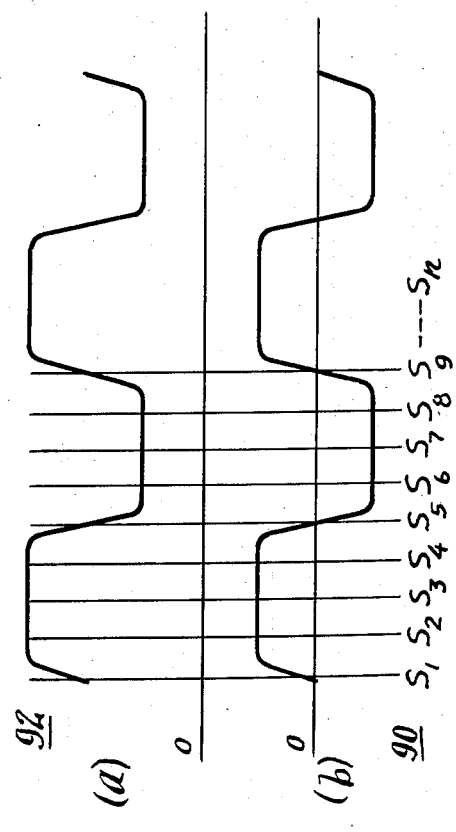

Fig. 38.
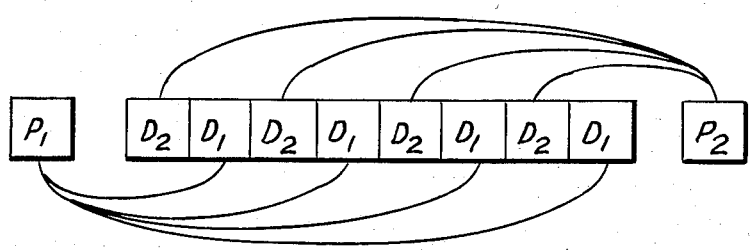
Fig. 39.
(a)
(b)
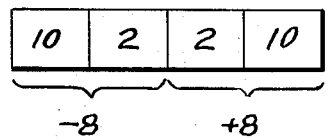
(c)
Fig. 40.
(a)
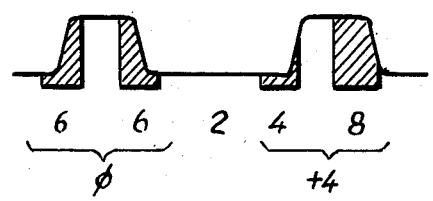
(b)
Fig. 42.
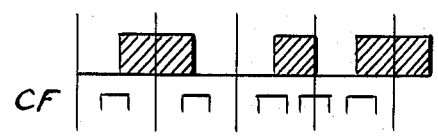

MEASURE TILT

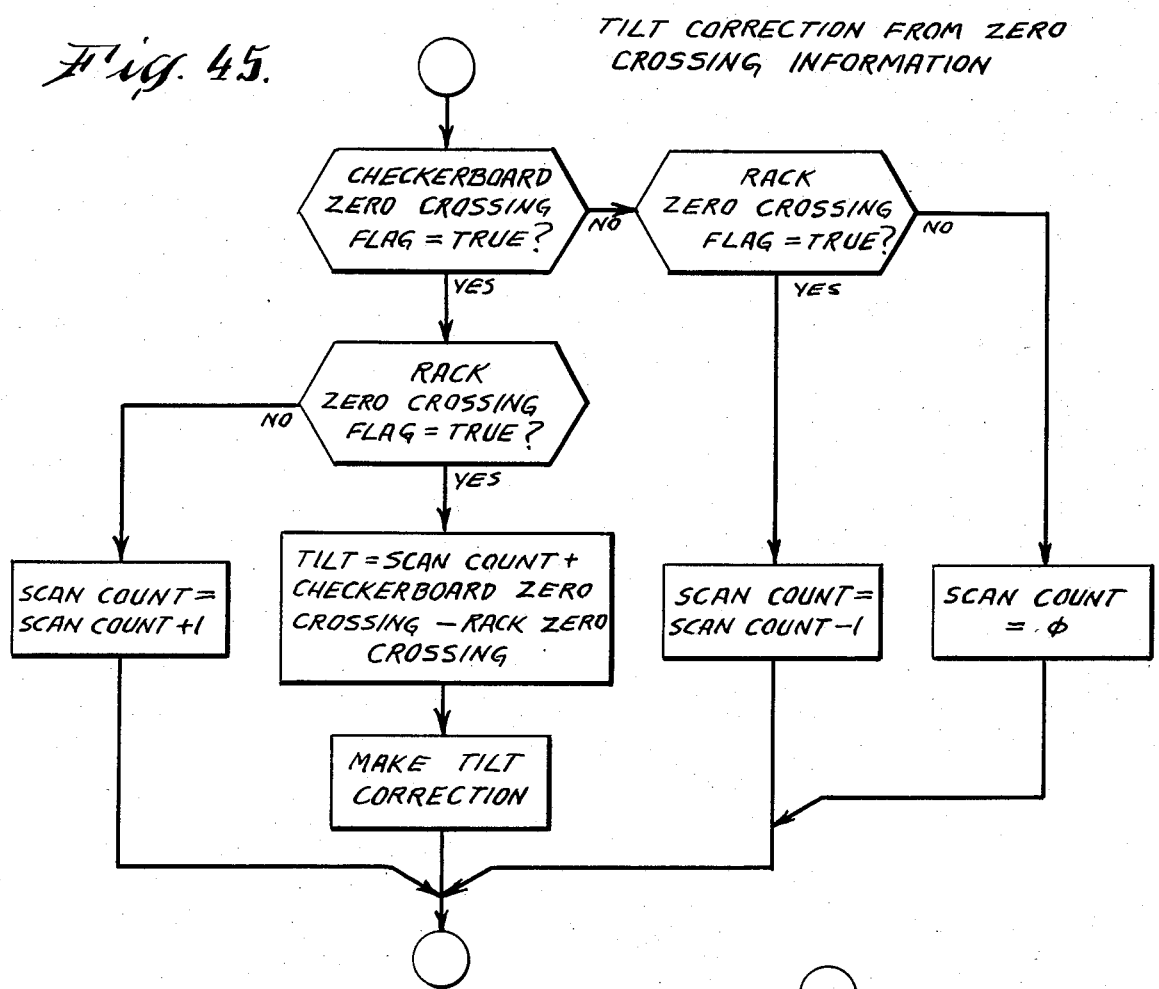
Fig. 45. TILT CORRECTION FROM ZERO CROSSING INFORMATION
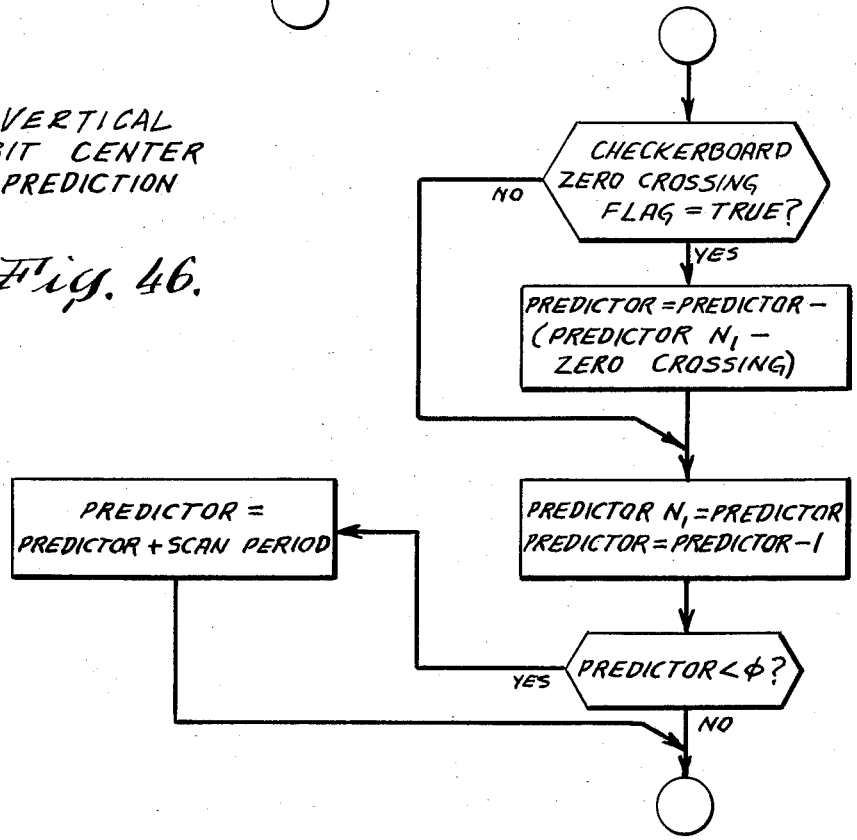
Fig. 46. VERTICAL BIT CENTER PREDICTION

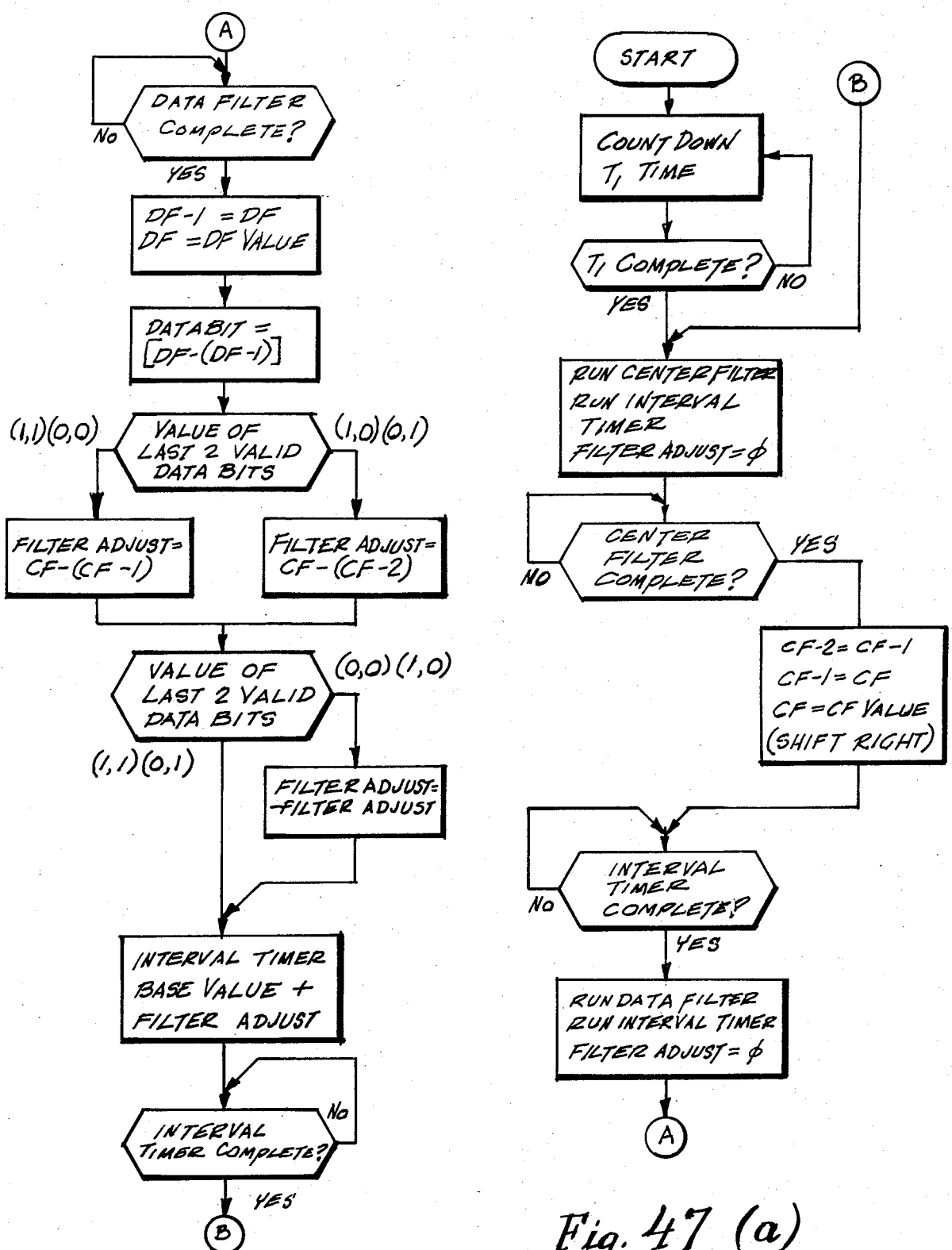
Fig. 47(b) CENTER FILTER
Fig. 47(a) CENTER FILTER

PARITY

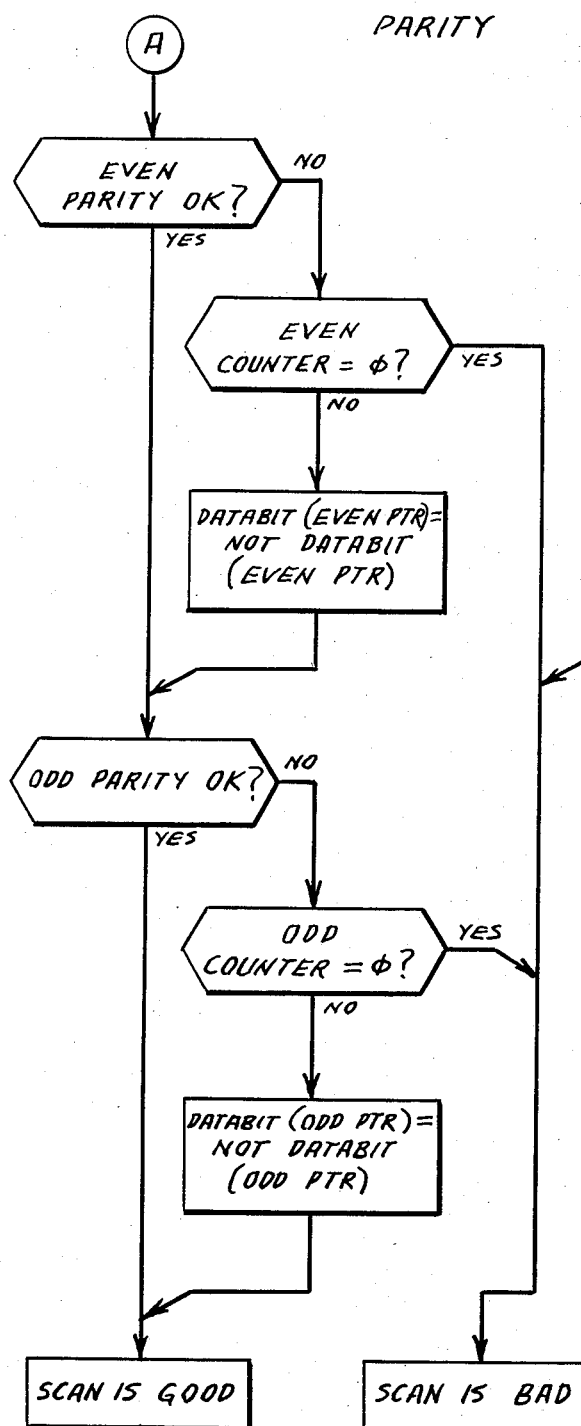
Fig. 48(b) PARITY
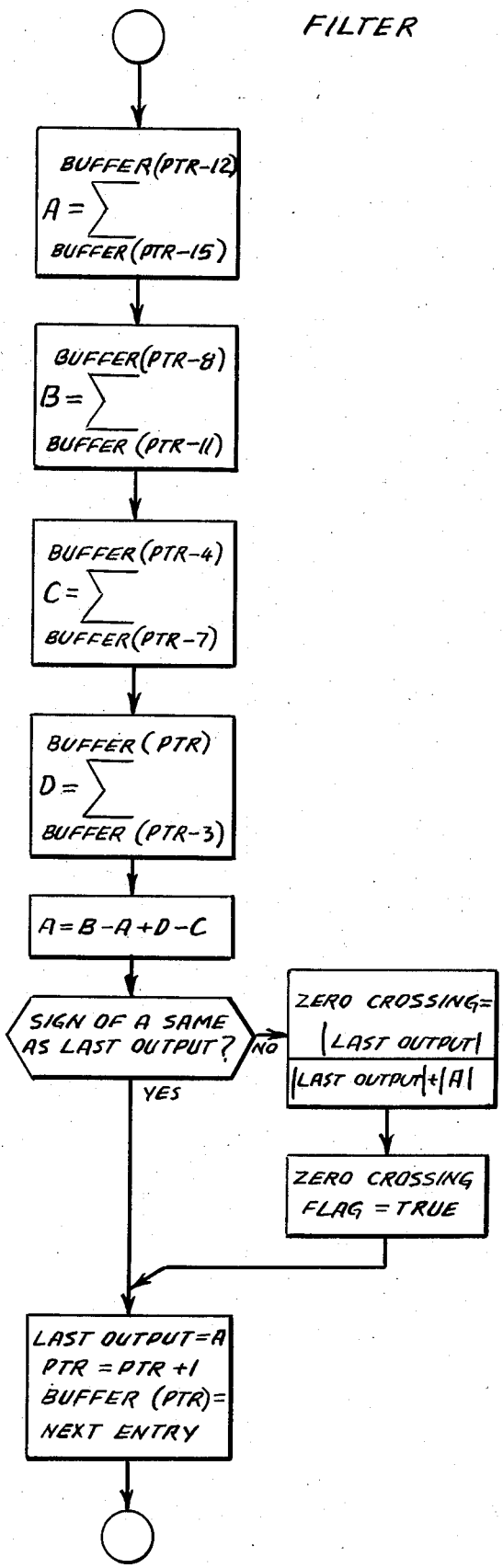
Fig. 49. FILTER

OPTICAL READER FOR PRINTED BIT-ENCODED DATA AND METHOD OF READING SAME

BACKGROUND

This invention relates to the field of printed, optically-encoded data and to techniques for reading it.

Prior optical systems have primarily utilized bar codes or codes utilizing character recognition, such as check-identification codes. Neither have permitted high density concentrations of information.

Bar codes utilize bars of varying widths, the widths usually bearing a ratio relationship to each other (such as 1:2:3); and the heights of the bars are not critical but must be adequately long to accommodate the scanner. The speed of scanning need not be pre-determined, since it is deduced by the reader during scanning, nor must the speed be constant during scanning. This imposes minimum practical widths and heights on the bars, and so limits the density of encoded information.

Optical character recognition requires characters of a minimum size and requires the utilization of multiple scans of each line in order to identify the character.

By contrast, the present invention utilizes a high-density data strip formed of a plurality of narrow "data lines" formed of uniform size, generally rectangular "bit areas". These bit areas are on paper or other substrate and are either dark (printed) or blank. The data lines are of uniform width and length, parallel, contiguous, and conterminous. Their combined widths form the longitudinal dimension of the encoded information portion of the data strip; and the bit areas are aligned in this longitudinal direction. The density concentration of bit areas is such that a typical strip might include 62 bit areas per data line and 300 data lines, thus providing 7,200 bits of information in a strip measuring, perhaps, 12.5×90 mm (0.5×3.5 inches).

The method and scanner of the present invention can not only be used to read strips of high-density data, but also to read strips having different densities. These different densities result from using different widths and heights of data areas. The data lines forming the data strip may vary in length or number from strip to strip.

The invention has means to self-adjust alignment of the strip with the scanner, both prior to and during scanning, and can also self-adjust its scanning rate for changes in density. It can utilize different inks, papers and substrates, and adjust for the relative contrasts between them. Its parity system can correct errors occurring in scanner readings due, for example, to scratches or the presence of dirt on some of the data areas.

Examples of bar and other codes and reading methods are found in Wilson U.S. Pat. No. 3,211,470, Seligman U.S. Pat. No. 4,049,224, and Bullis U.S. Pat. No. 4,308,455. Additional patents showing systems for reading are Sharkitt U.S. Pat. No. 3,780,271, Dolch U.S. Pat. No. 3,852,573, Lloyd U.S. Pat. No. 3,886,371, Laurer, U.S. Pat. No. 4,414,468; and certain types of apparatus are shown in Freidman U.S. Pat. No. 3,716,660 and Ortman U.S. Pat. No. 3,549,894.

BRIEF SUMMARY OF THE INVENTION

This invention relates to a method and apparatus for reading data printed in a unique form on a paper strip or other substrate.

Various types of readers (scanners) exist for reading bar codes of printed matter. Many of these readers read lines, representing "bits", and, normally, the speed of scanning and the portion of each bar read, are not critical.

By contrast, the present invention relates to the reading of "data lines" or rows of uniform-sized bit areas (of a generally square, and relatively minuscule, shape and size). These data lines of bits are of uniform length and are printed side by side, contiguous to another, to form a "data strip".

A typical data strip might be about 16.0 mm (five-eighths inch) wide and about 255 mm (ten inches) long and be printed near the edge of a sheet of 215×280 mm (8½"×11") paper. Information would be stored in rectangular areas, measuring about 0.25 mm (0.010") high by 0.15 mm (0.006") wide; data lines would run transversely to the longitudinal dimension of the data strip. Scanner control data may be printed at the ends and along the edges of the data strip.

Preferably, instead of using simple bits, the data is encoded in "dibits", which are paired bits of either white-black ("off-on") or black-white ("on-off") sequence along the data line, each dibit constituting one ultimate bit of information. Dibits give a synchronization means and an error correction and detection means. Parity checks are provided at the ends of the data line; one at the left side of the dibits, the other at the right. This provides for greater accuracy in the readout.

Means are provided for scanning the data lines one at a time and sequentially as the scanner is moved longitudinally relative to a data strip. The speed of scanning is known relative to the length of a data line, since the scanner operates on a controlled time cycle, i.e., the bits are read sequentially along the data line at time intervals corresponding to the width of the bits. Normally, the rate of longitudinal movement is such that each data line is scanned three or more times. Only one of these scans, an accurate one, is actually utilized.

Scanning is accomplished by using crossed cylindrical lenses moving relative to one another, with a detector positioned at the common focus point of the two lenses, i.e., where the focal lines of the lenses cross. One lens is positioned parallel to the data line and moves slowly down the data strip in a direction perpendicular to the data line (parallel to the longitudinal dimension of the data strip). The other, upper lens is substantially perpendicular to that of the first lens and to the data line, and moves along the data line. The truncated lengths of both lenses are parallel to the surface of the paper (or other substrate) which carries the printed encoded dibits.

The upper lens moves more rapidly than the lower lens relative to the data strip. Consequently, the relative speeds of motion are such that the dibits in each data line are scanned a plurality of times before the next data line is reached.

For greater scanning speed, there are several, similar upper cylindrical lenses. These lenses are mounted equidistantly along the periphery of a rotatable drum and take turns scanning the data line. Timing means are provided, associated with the drum, to assure control of the scanning time cycle relative to the length of the data line. Normally, the focal length of each lens is at the axis of the drum, and the detector is located at that point.

The lower lens, rotatable drum, and a light source are carried upon a chassis adapted to move along a carrier rail inside the reader. Means are provided for spacing the chassis above the data strip and moving it longitudinally along the data strip at a speed which is synchronized with the rate of rotation of the drum. Means are also provided for aligning the lower lens so that it is parallel to the data line.

A correction lens, or "field flattener" is associated with the lower lens to correct for focus problems associated with the varying distances of the dibits from the detector between the center and ends of the data lines. This lens also serves to cause the scan angle to be more nearly perpendicular to the paper.

The lower lens and flattener may be formed by any method but, preferably, they are molded integrally from clear acrylic plastic under high pressure. Similarly, the multiple upper lenses and rotatable drum may be molded as a unitary unit.

The output of the principal detector, and of additional detectors associated with timing control, is fed to a logic circuit and computer, and the encoded data from the data strip can be used for any purpose. For example, it can be read directly as on a cathode-ray tube monitor, or otherwise, or may be used to program a host computer for other purposes. Appropriate software is used to control the means for aligning the lower lens, for setting the computer for the height and dibit-width of the data lines of a particular data strip, for selecting the scan to be used from multiple scans of a data line, for parity check and error correction, and for decoding of the dibits as they are read.

DETAILED DESCRIPTION OF THE DRAWINGS

FIG. 2 is a plan view from above of the reader.

FIG. 3 is a front elevation of the reader as it would appear to a user viewing it from the side.

FIG. 5 is a schematic, perspective view of crossed cylindrical lenses.

FIG. 6 is similar to FIG. 5, but in front elevation showing some of the optical principles involved.

FIG. 6a similar to FIG. 6 but in side elevation.

FIG. 7 is a simplified view, from the side, of the scanner (carried by a chassis within the reader) to show the general principles of its operation.

FIG. 8 is a schematic drawing showing certain problems relating to focusing the scanner at different positions of the line being scanned.

FIG. 9 is a further illustration of certain focusing problems.

FIG. 10 is a view of a typical sheet of paper carrying a data strip. as used in this invention.

FIG. 11 shows the two types of "dibits" (dual data bits) used in the data strip.

FIG. 12 is an enlargement of a portion of the data strip shown in FIG. 10.

FIGS. 13 and 14 are enlarged portions of the alignment guidelines of the data strip.

Figure 18:
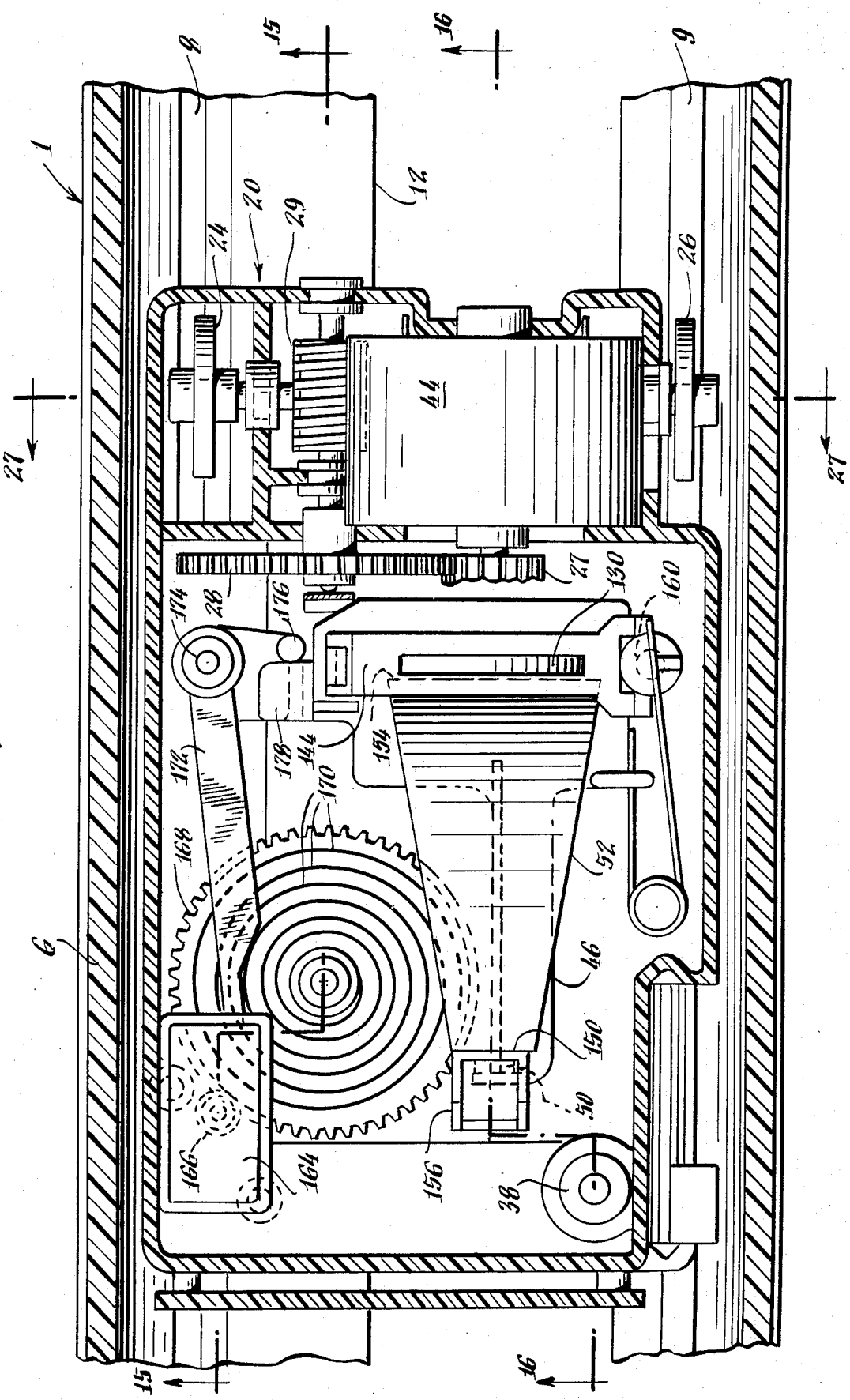

FIG. 15 is a partial vertical section through the reader, taken on line 15—15 of FIG. 18, showing the driving mechanism for moving the scanner-carrying chassis along the data strip.

FIG. 16 is a partial vertical section, taken on line 16—16 of FIG. 18, showing the optical system.

Figure 17:
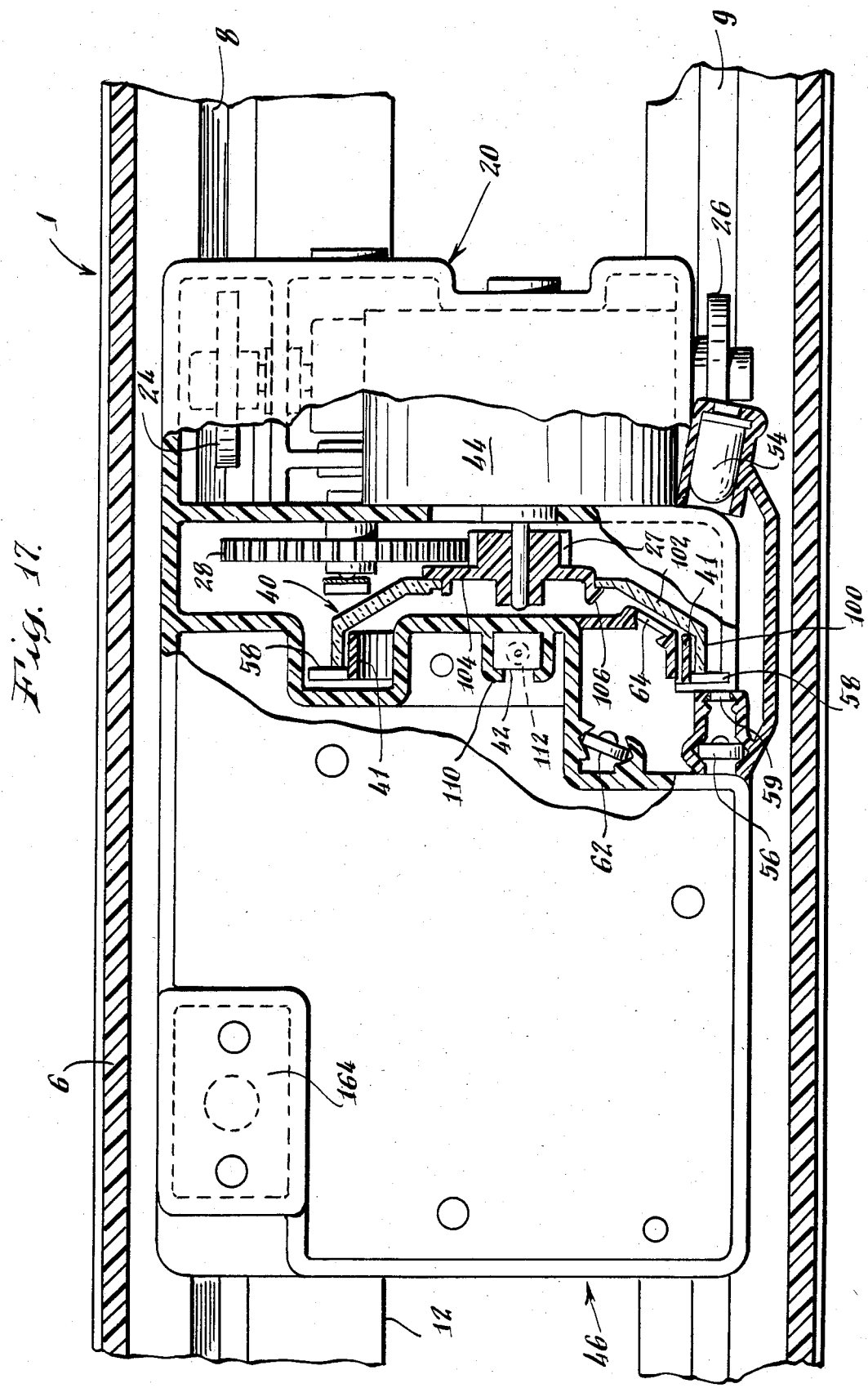

FIG. 17 is a partial horizontal section, taken on line 17—17 of FIG. 16, giving further details of the optical portions of the system.

FIG. 18 is a partial horizontal section, taken on line 18—18 of FIG. 16, showing the tilt alignment mechanism and portions of the chassis driving means.

FIG. 19 is a perspective view, partially broken away, showing the lower lens and flattener.

FIG. 20 is a perspective view of the light pipe used to illuminate the line of data being scanned.

FIG. 21 is a vertical section through the reader, taken on line 21—21 of FIG. 15, showing the means for aligning the detector chassis on its carrier rail.

FIG. 22 is a vertical section through the reader, taken on line 22—22 of FIG. 10, showing portions of the optics.

FIG. 23 is an exploded view of the revolving drum carrying multiple lenses.

FIG. 24 is a side elevation of the drum showing the positioning of the lenses and of the timing structures.

FIG. 25 is a partial section, taken on line 25—25 of FIG. 24, showing the pulse timing lenses on the revolving drum.

FIG. 26 is an enlargement of a portion of a section of FIG. 22, from the center of the revolving drum, showing the detector and aperture plate.

FIG. 27 is a vertical section through the reader, taken on line 27—27 of FIG. 18, showing portions of the chassis driving and control mechanisms.

Figure 28:
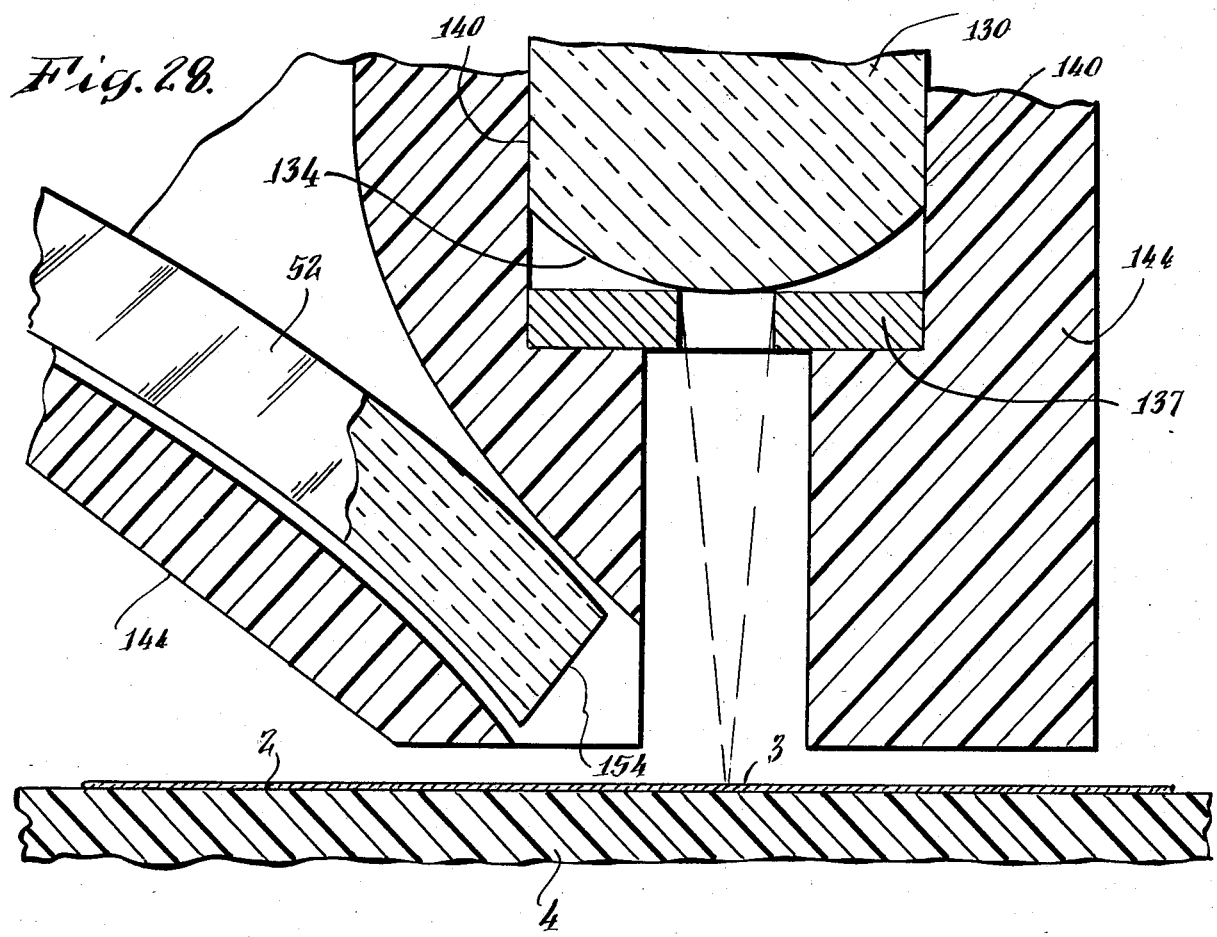

FIG. 28 is an enlarged detailed vertical section, at the point of reading of the data strip, as illuminated by light from the light pipe in association with the lower lens.

Figure 29:
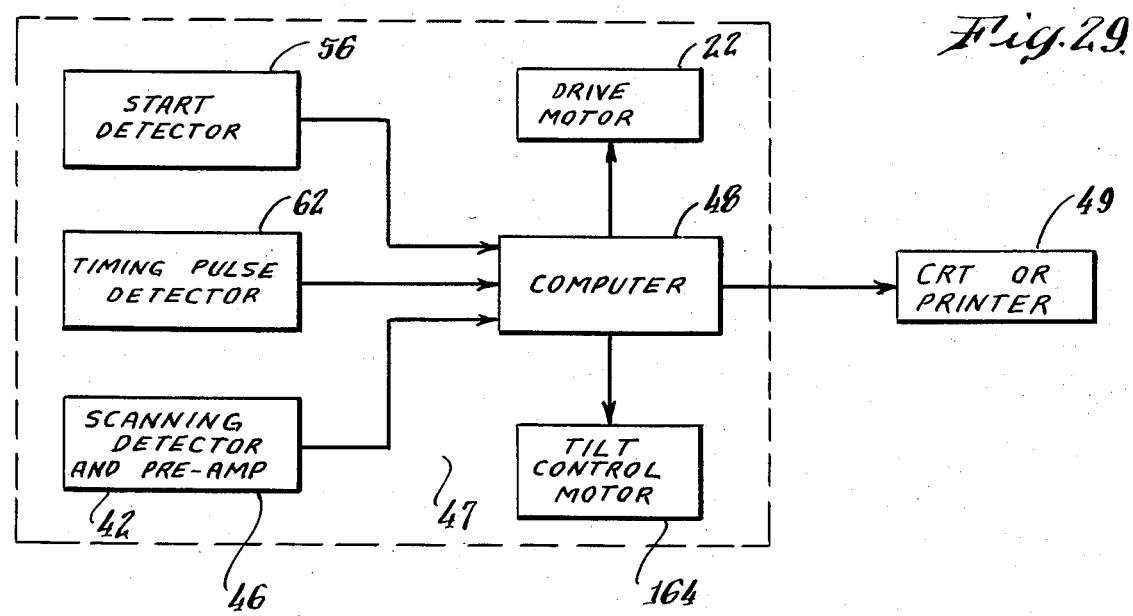
Figure 41:
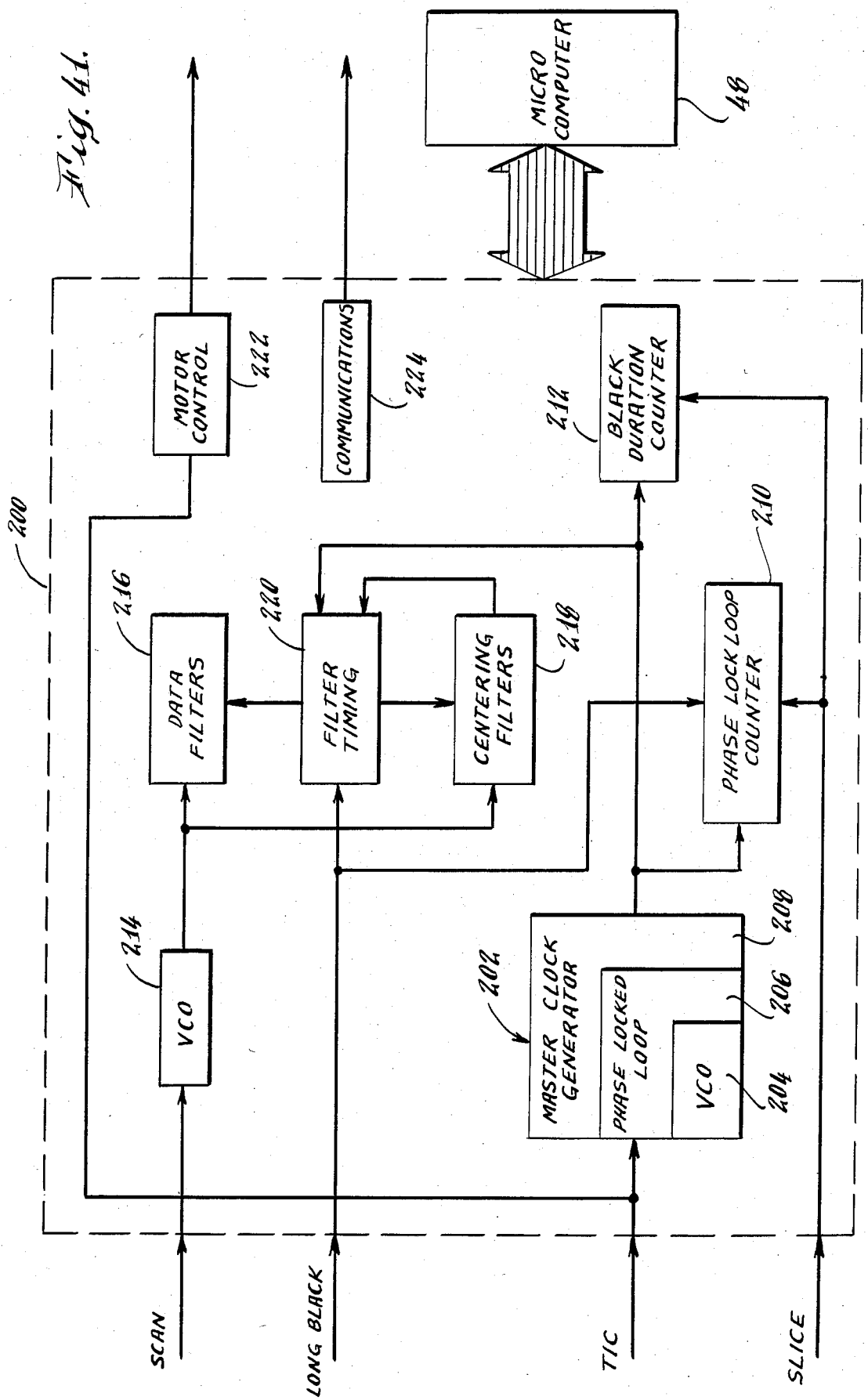

FIG. 29 is a simplified schematic circuit diagram. A more detailed diagram is shown in FIG. 41.

Figure 30:
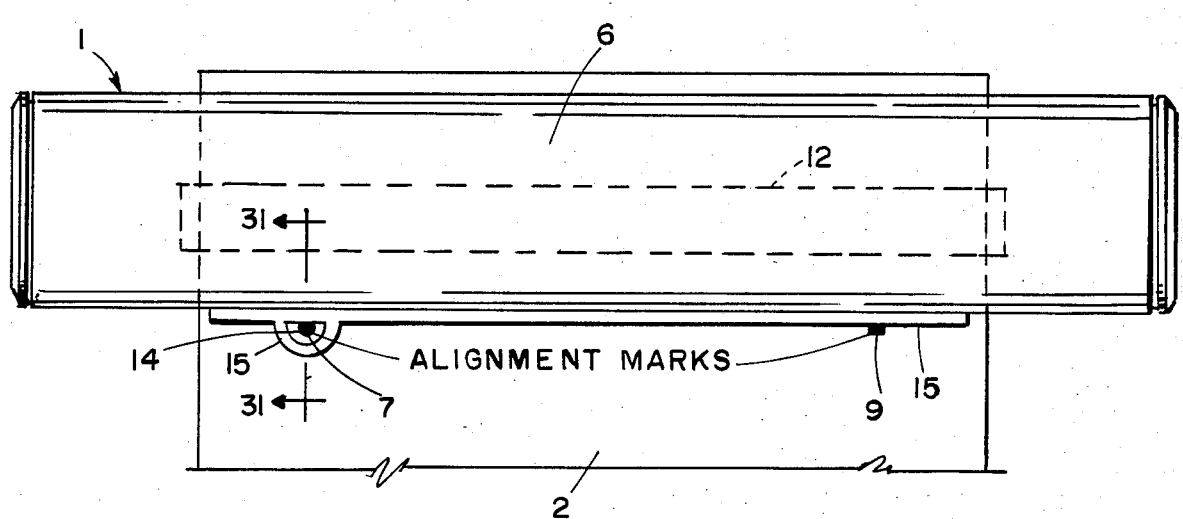

FIG. 30 is a horizontal section through the reader, taken on line 30—30 of FIG. 3, showing a technique for aligning data strips.

Figure 31:
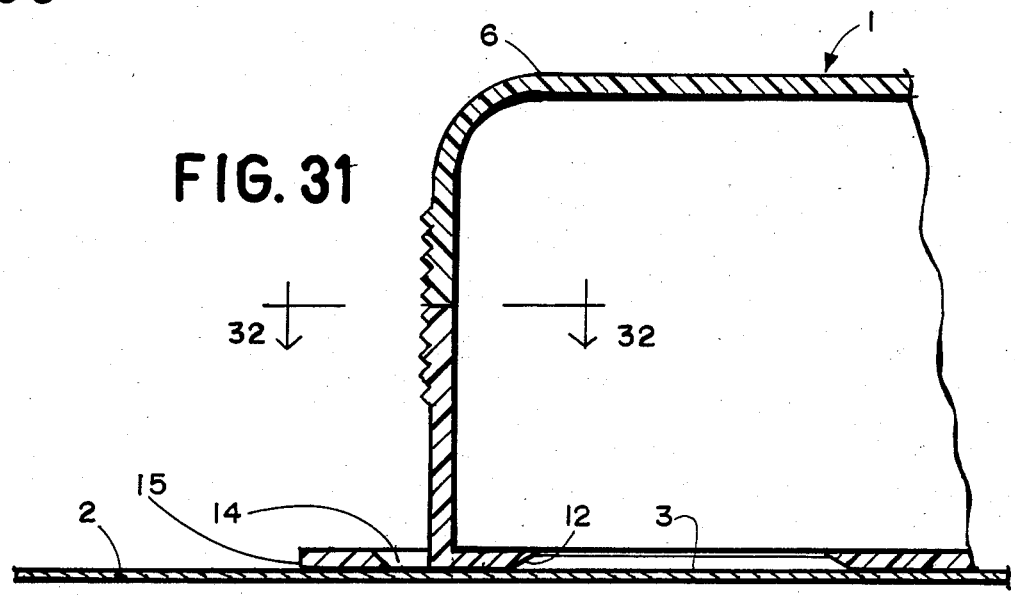

FIG. 31 is a vertical section, taken on line 31—31 of FIG. 30, giving details of the alignment means.

Figure 32:
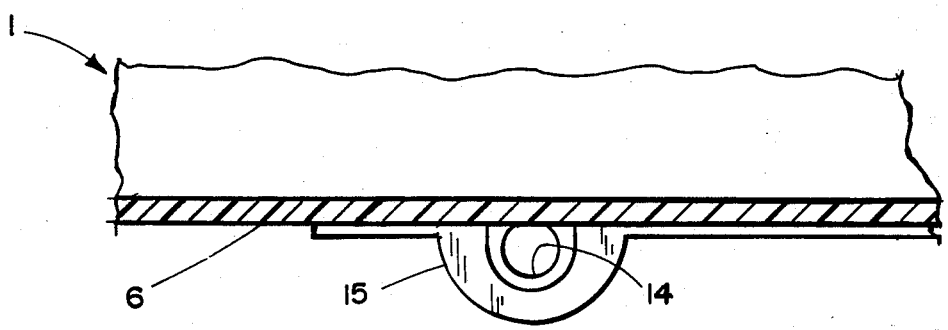

FIG. 32 is a vertical section, taken on line 32—32 of FIG. 31, giving further details of the alignment means.

Figure 33:
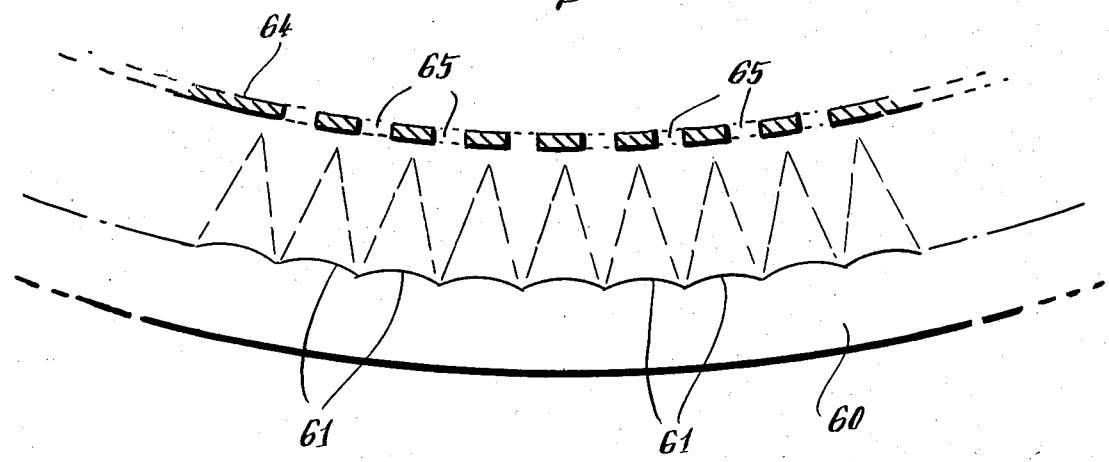

FIG. 33 is a schematic diagram showing the operation of the moire timing pulse control means.

Figure 34:
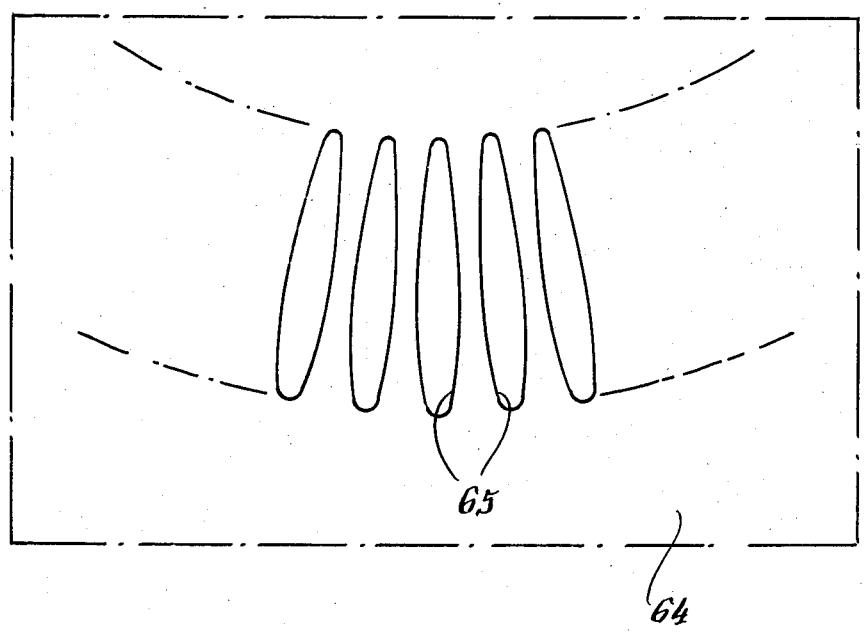

FIG. 34 is a plan view of a moire mask of a type usable in association with the timing pulse control means of FIG. 30.

FIG. 35 illustrates waveforms generated by a scan across the beginning portion of the data strip.

FIG. 36 parts (a) and (b) are waveforms derived from the sawtooth and checkerboard portions of the data strip.

FIG. 37 parts (a) and (b) are filter outputs derived from the inputs of FIG. 36.

FIG. 38 is a diagram illustrating parity check.

FIG. 39 parts (a)-(c) is a sequence of diagrams illustrating density difference measurement.

FIG. 40 parts (a), (b) are diagrams illustrating the result of changing centering filter placement.

FIG. 41 is a block diagram of a logic circuit chip usable in the invention.

FIG. 42 is a diagram illustrating centering filter placement.

Figure 43:
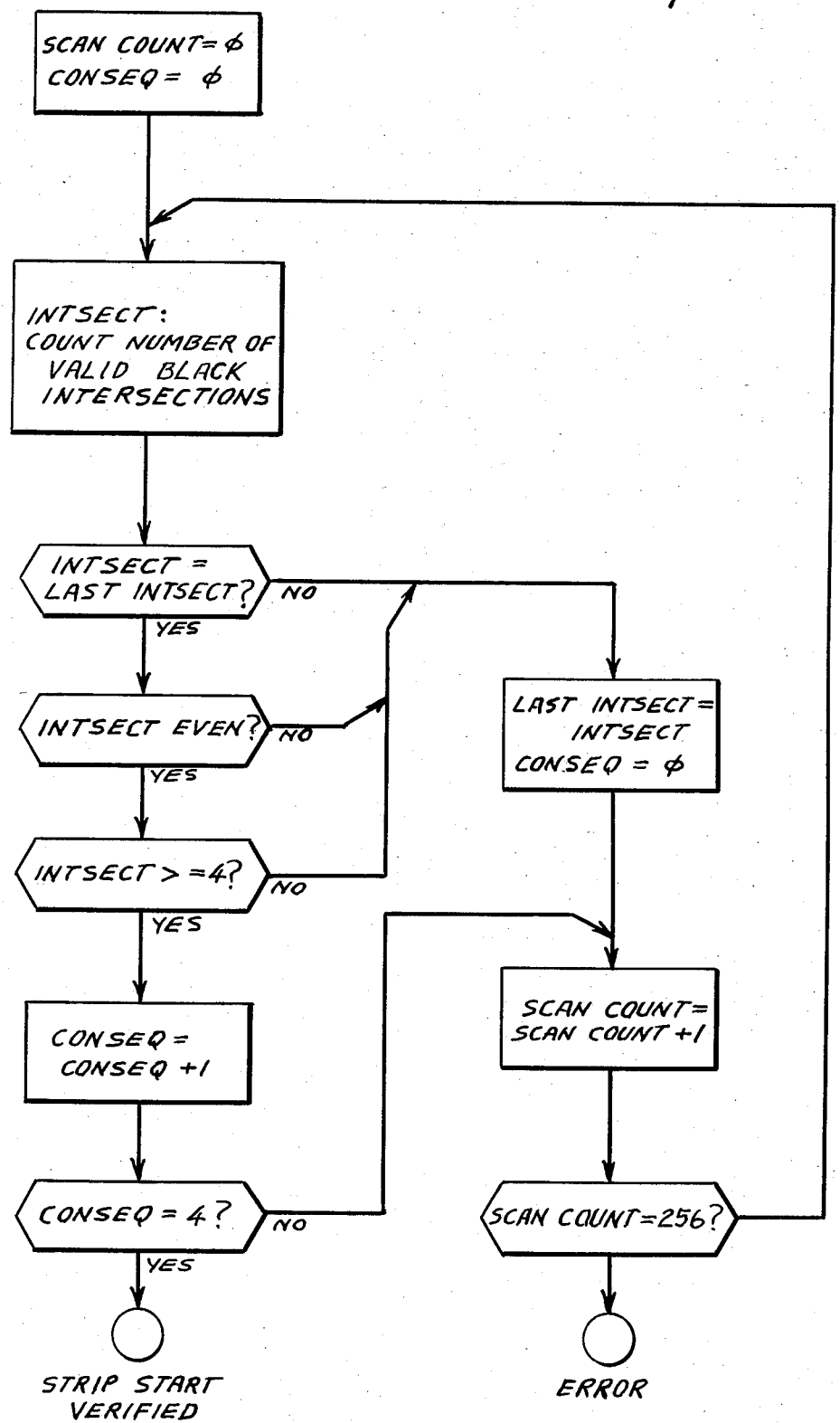

FIG. 43 is a flow chart of the start verification program.

Figure 44:
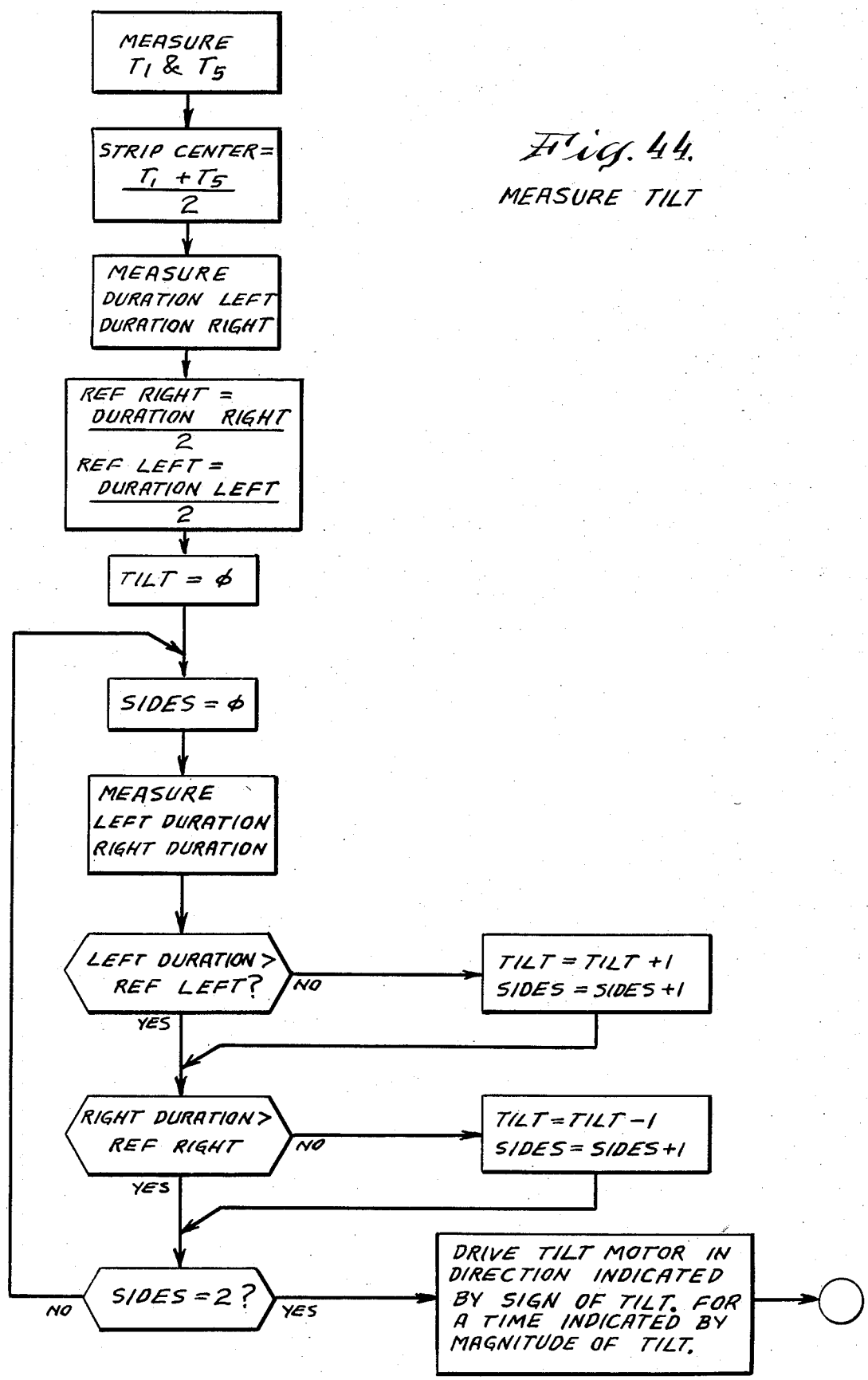

FIG. 44 is a flow chart of the coarse tilt adjustment program.

FIG. 45 is a flow chart of tilt correction from zero crossing information.

FIG. 46 is a flow chart of vertical bit center prediction.

FIGS. 47(a), (b) are the flow chart for centering filters.

Figure 48A:
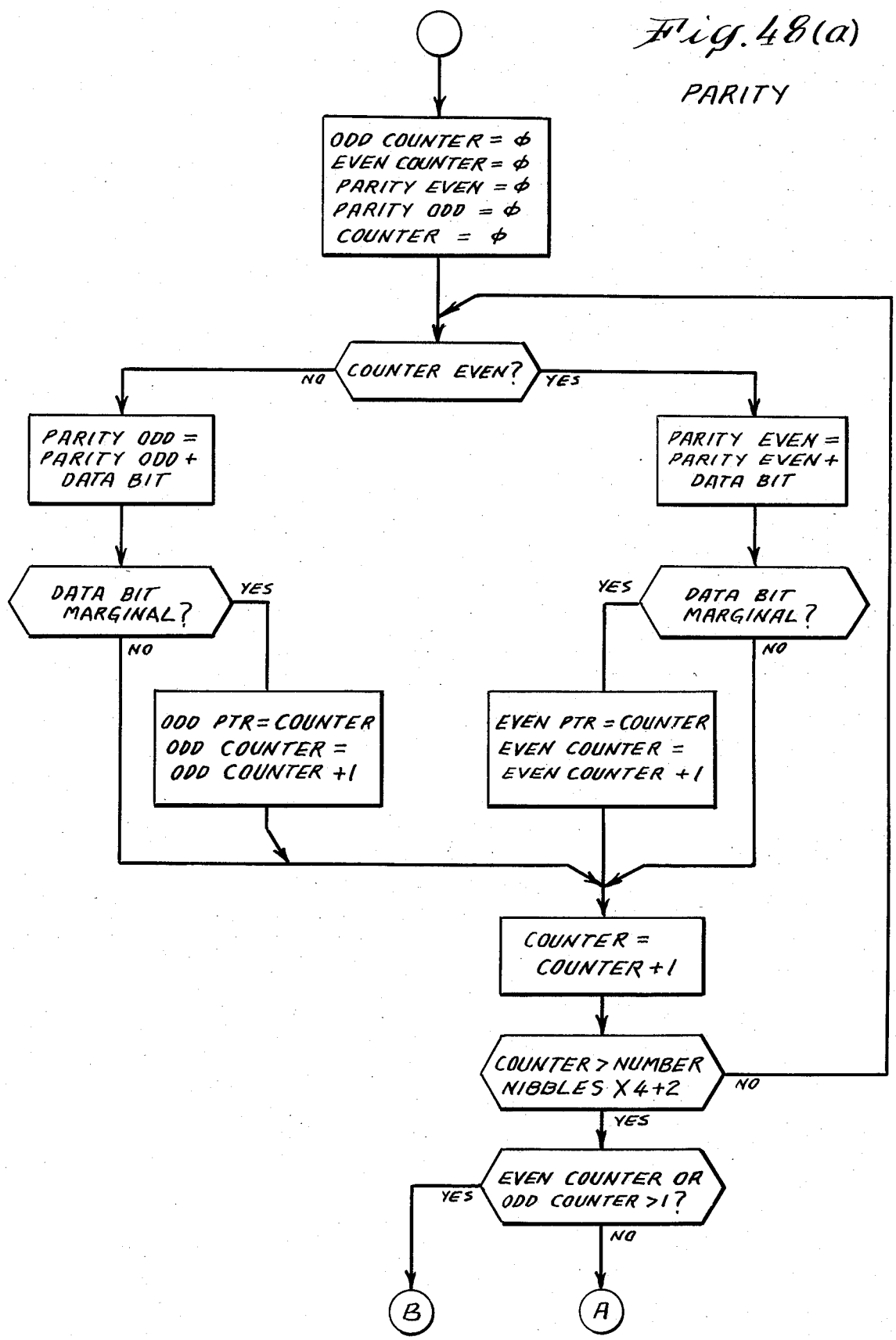

FIGS. 48(a), (b) are the parity check flow chart.

FIG. 49 is the flow chart for the generalized filter algorithm.

DETAILED DESCRIPTION OF THE INVENTION USES

This invention relates to a method and apparatus for reading encoded binary data that is printed or otherwise optically formed on a sheet of paper or other substrate. The usual form for the totality of the data is a data strip 3 printed parallel to and near the edge of a standard sheet of paper 2. This encoded data is made up of a series of adjacent lines or rows of rectangular areas, each row of areas being called a "data line" 76 (FIG. 12). These data lines 76 are contiguous, one above the other, are parallel and conterminous, and together form data strip 3. The data lines 76 run perpendicular to the longitudinal direction of the strip. ("Longitudinal" is vertical in FIGS. 10 and 12). The encoded information portion 86 of a data strip 3 is made up of a plurality of data lines 76 and might include, for example, 250 such lines.

The height of the bit areas is the width of the data line and normally ranges from about 0.25 mm to about 0.9 mm (0.010 inches to 0.035 inches). The width of the bit areas (in the longitudinal direction of the data line) normally ranges from about 0.15 mm to about 0.43 mm (0.006 inches to 0.017 inches) the width of a dibit (FIG. 11) would be double this. One size high density encoding would have bit areas measuring 0.25 mm (0.01 inches) high by 0.15 mm (0.006 inches) wide (dibit width, 0.30 mm): and a low density encoding would have bit areas 0.50 mm (0.02 inches) high by 0.38 mm (0.015 inches) wide (dibit width, 0.75 mm).

The reading device, or reader, is adapted to receive and hold the data strip, align it properly, and scan it. By way of illustration, the reader might be adapted to receive and hold the edge of a piece of 215×280 mm (8½×11 inches) paper having a printed data strip on it measuring perhaps 16 mm (⅝ inches) wide (slightly wider than the length of the data lines) and about 250 mm (10 inches) long. Alternatively, the reader might receive a data strip printed separately, for example, printed on the side of, say, a cereal box as a premium, or otherwise. The reader must be able to scan dibits of information in the above dimensional range. For this purpose, it has been found that a scanning spot 0.076 mm high by 0.10 mm wide (0.003 inches by 0.004 inches) is useful. The scanner moves longitudinally of data strip 3 about 0.064 mm for each scan, and, so, each data line is scanned (with a slight overlap) several times over different portions of the bit heights.

Figure 1:
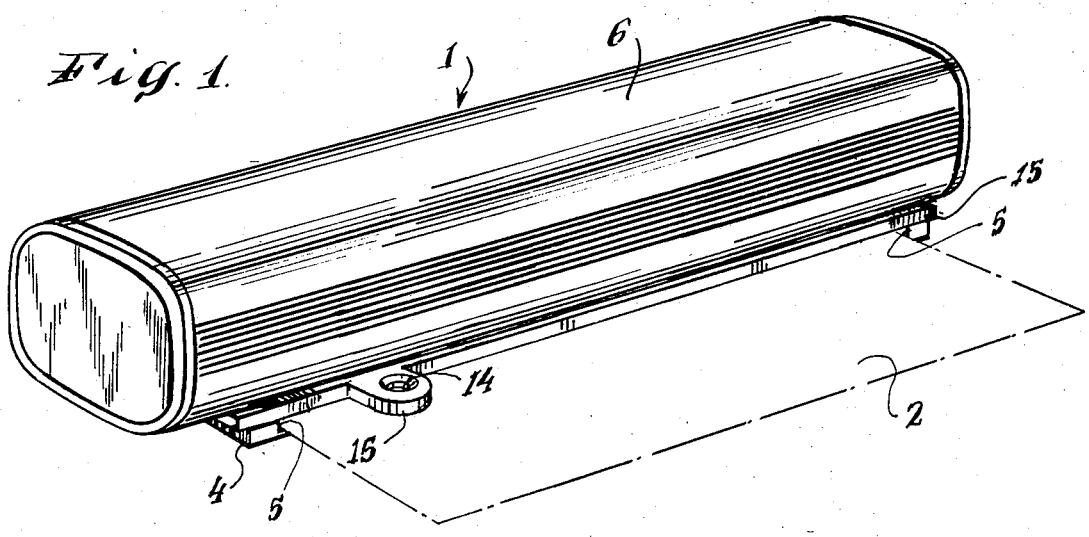
FIG. 1 is a perspective view of the reader, showing a sheet of paper with its data strip positioned within the reader.

A perspective view of the reader 1 is shown in FIG. 1. As shown, it has a piece of paper 2 in position for scanning; the data strip 3 on paper 2 is under reader 1. Sheet 2 carries printed alignment marks 7 and 9, in pre-determined positions relative to data strip 3 and parallel to it. Mark 7 is located before the beginning of strip 3.

Reader 1 includes a housing 6 which rests on a base 4, which is complementary to the housing, enabling the base to fit the lower portion of housing 6 and forming a slot to receive paper 2. Housing 6 is preferably formed of two complementary molded plastic halves. Molded integrally internally of the housing are guide rails for carrying the chassis 20 bearing the scanning apparatus. These include lower rails 8 and 9 and upper flat pressure rail 10. Housing 6 includes a slot 12 in the bottom of housing 6, below chassis 20, by means of which data strip 3 may be viewed by the scanning mechanism carried by chassis 20.

Housing 6 includes projecting alignment ring 14 and bar 15 for alignment with marks 7 and 9 on paper 2, the data strip being positioned with the circular mark 7 under ring 14 and the rectangular mark 9 abutting bar 15.

There are times when the data strip 3 is printed on a different substrate than a standard size of paper. This could be on a piece of cardboard, such as the side of a box. The housing 6 of reader 1 must then be separately placed over the data strip 3; and alignment is achieved in the same way by setting spot 7 under ring 14 and having mark 9 abut bar 15 to be scanned.

In use, the paper 2 carrying the data strip 3 is inserted between the alignment guides 5 so that the data strip 3 is positioned below slot 12 in the bottom of the housing, and alignment of the strip achieved as above. If desired, there may be a standardized position on the paper for location of the data strip, and stops provided in the base (not shown) to limit the insertion of paper 2 and position it with data strip aligned under slot 12. The scanner is then actuated (described below); the scanning chassis 20 then moves to the lead end of the data strip and moves down it, aligning itself and reading the encoded data.

GENERAL THEORY OF OPERATION

In reviewing the concept of operation, it should be noted again that the unit is dissimilar from a bar code reader. The latter reads lines of varying widths, not uniform bits arranged in lines and the speed of motion of the bar code detector along the bar code is deduced by the scanner (not predetermined), and can vary. In the present system the speed must be known relative to the data line (containing the bits), since the scanner operates on a controlled time cycle, i.e., the bits (or dibits) are read sequentially along the data line at time intervals corresponding to the widths of the bits. It is, therefore, necessary to have a scanner capable of reading small bit areas (as indicated above, these areas can have dimensions as small as 0.15 mm, or smaller). In contrast to a bar code, the data strip uses small, rectangular (almost square) bits and includes reading control areas.

The general theory of operation is described in relation to FIGS. 5 through 9, and, in particular, FIGS. 5, 6, 6a and 7.

It is necessary to have a method of scanning that scans spots along a given data line and then scans the spots along the adjacent data line, and so on until the end of the data strip is reached. This is accomplished by using crossed cylindrical lenses. A cylindrical lens is one which focuses a small area or spot of light along a straight line. A simple example of such a lens would be a clear glass cylinder. We prefer to use lenses having a semi-cylindrical cross-section, but any convex circularly curved cylindrical surface having the right focal length should suffice. As used herein, cylindrical lens refers to any of these.

The broad principle of operation of the scanner is to utilize two cylindrical lenses, one above the other and positioned generally transversely to each other. This is shown in FIG. 5, with a lower lens 30 and an upper lens 32. Lower lens 30 will take the line below it and focus it in a line. Upper lens 32, being transverse to lower lens 30 will select a portion of that line to be focused in a spot.

In operation, the lower lens is aligned over a data line and so focuses all of the dibits in that line along its focal line. Upper lens 32 moves along lower lens 30 in a direction axially of lens 30 and so selects the bit from the data line that is to be focused. The axes of the two lenses are parallel to the surface of the paper being scanned, and the detector is at the point of common focus of the two lenses. FIG. 6 shows, in simplified cross-section, the nature of the operation. The data strip 3 is beneath the lenses and in the focal plane of lens 30. Lens 30 is above data strip 3 and parallel to the data lines. (The data lines are perpendicular to the long axis of the paper in the drawing of FIG. 6). Above lens 30 is crossed cylindrical lens 32 which moves in a direction parallel to the plane of the paper. The two lenses focus a point on a data line on detector 34. As a result, when lens 30 is over one data line, that line is scanned as upper lens 32 moves along the length of lower lens 30; and the information is detected by detector 34. After a given line is scanned lens 30 is moved to the next data line and the process is repeated. In practice, lens 30 moves continuously along data strip 3 as the scanning takes place, and each data line is scanned several times (as described below, only one scan of a given data line is ultimately used).

Lines 36 in FIG. 6 are rays to indicate the focusing of the particular spot from data strip 3 on detector 34. FIG. 6a is a side elevation of the disclosure of FIG. 6.

General application of the above principles used in this invention is shown in FIG. 7. The essential difference in FIG. 7 is that multiple upper lenses, such as 33, are used (mounted on a revolving drum), a light source is provided, and means are provided for controlling the timing of the scanning lenses relative to their position on the data line.

FIG. 7 shows the data strip 3 positioned under lens 30 in a manner similar to that shown in FIG. 6. Lens 32, however, is represented by a plurality of upper lenses 33 mounted equidistantly along the periphery of a rotating drum 40. The combined focal point of lenses 30 and 33 is at the axis of drum 40, and so a detector 42 (equivalent to detector 34) is positioned at that focus point. A motor 44 serves to rotate drum 40 at a constant speed; and the output of detector 42 is amplified in pre-amplifier 46 and fed to logic circuit 200 and computer 48. The computer output goes to a CRT or a printer 49 or to a host computer 51. (See FIG. 29; FIG. 41 provides more specific circuit data.)

Drum 40 and its associated lenses are preferably molded integrally from clear acrylic resin.

In practice the height of the actual spot scanned in each bit is about 0.076 mm (0.003 inches), less than the height of the bit ("height" is the width of data line 76); its width is about 0.10 mm (0.004 inches). The area scanned by the moving scanning lines is less than the width of the data lines 76 (the height of the bits), so that, in multiple scanning of a given data line, different portions (0.064 mm apart) of the width of the data line will be scanned and each data line 76 will be scanned a plurality of times (three or more). The data line scanning is at a speed sufficiently greater than the longitudinal movement of the scanning spot along data strip 2 to cause each line to be scanned a plurality of times before the adjacent data line is scanned. Only one scanning of each data line is utilized for retrieval of encoded information.

As a result, it has been found that a drum of about 38.5 mm (1.5 inches) in diameter, having eight equally spaced upper lenses 33, rotating at a maximum rate of 1500 rpm, functions well for most computers. Under these circumstances each of the upper lenses 33 would have a focal length of about 7.6 mm (0.3 inches); and the lower lens 30, a focal length of about 3.3 mm (0.130 inches). To provide the extreme accuracy required, the drum 40 and lenses 33 are integrally molded under high pressure of about 500 to 1500 atmospheres.

As can be seen, the upper lens 33 is generally parallel to the longitudinal dimension of data strip 3, and lower lens 30 is generally perpendicular to it.

Matched infra-red LED light sources and detectors are used, often of a wavelength of 940 nm. Use of infrared also serves to increase the signal-to-noise ratio in the reading, over visible light. The infra-red LED light source is 50; and the light from LED 50 is carried by light pipe 52 to illuminate the data line 76 being scanned. As will be described below, light pipe 52 and lower lens 30 can be rotated about a vertical axis to be certain that lower lens 30 is parallel with the direction of the data lines. This may mean that the axes of lenses 30 and 33 are not exactly perpendicular, but any error introduced (a maximum of ±1.7 degrees) is of no consequence.

Two systems for controlling timing, and thus assuring accuracy, are included in the unit. First of all, it is important to know the position of the particular one of upper lenses 33 then in use. Secondly, it is important to know the exact rate of rotation of the drum.

The first of these is determined, as schematically illustrated in FIG. 7, by the combination of a second LED light source 54 and detector 56 feeding logic circuit 200. The position of the drum can be determined by having the light beam from LED 54 interrupted by a chopper or spoke 58 or some similar structure which is positioned on drum 40 in a position relative to the lenses 33 (there would be a spoke 58 for each of lenses 33). When the spoke 58 breaks the light beam from LED 54 to detector 56, this serves to identify the exact position of the respective lens 33.

The rate of rotation of drum 40, and so the scanning rate, can be established by molding timing lines 61 into a portion of drum 40. The drum has the shape of a truncated cone at one end, and the timing lines are molded in the conical portion in a radial direction. Light from LED 54 passes through this portion, being interrupted by the timing lines, and is received by detector 62 on the opposite side, which feeds logic circuit 200. The accuracy of the reading of the timing lines 61 can be enhanced by use of the moire effect. To this end a moire screen 64, with similar radial lines, is placed in the light path between LED 54 and the detector 62. The result is a greater criticality and accuracy in reading of the light pulses. For greater accuracy the timing lines 61 are molded as lenses, focused on the moire screen (focal length normally about 1.25 mm (0.05 inches).

The use of crossed cylindrical lenses to focus from a planar piece of paper upon a detector causes certain problems of focus since the distance between the detector and the paper is less at the center of the data line than at its ends. This is emphasized when, as here, the upper lenses 33 are in a drum rotating around and centered on the detector and the lower lens is parallel to the paper.

The problems of the upper lenses are illustrated in FIG. 8. Since the lenses 33 remain at the same distance from detector 34, their focal plane is curved about the detector, as shown by the arc 66 in FIG. 8. It can be seen that a lens 33 is more sharply focused on data strip 3 at the central portion (note that the schematic view of FIG. 8 is in effect a view along the axis of drum 40 and that, for simplicity, lens 30 has been omitted). One can, of course, establish an average plane of focus if desired. If, however, one seeks to maximize the possible density of bits of information on the data strip, it is necessary to have a sharp focus.

The problem illustrated by FIG. 8 is corrected by adding an additional lens below lenses 33 that changes the effective focal length of lenses 33 from one position to another along the scan line (data line 76). This lens, not shown in FIG. 8, is referred to as a "field flattener". It is a cylindrical lens which, if added to FIG. 8, would have its axis generally parallel to the data line 76 and extend for the length of the data line. Its radius varies between the central portion and the ends of the lens, being smallest in the central portion, and so serves to receive light rays perpendicular to the paper, thus reducing criticality of focus. Its bottom surface is formed in the shape of a portion of a toroid. This cures the focusing problems illustrated by FIG. 8.

A second problem (FIG. 9) of focus arises because of the varying distances of the lower lens 30 both from data strip 3 and from detector 34 between the center of the data line and the outer edges of the data strip 3. The distance between the data strip and lens 30 at the center is indicated by the distance "A" and at the ends by the distance "B" and is caused by the difference in angle of viewing as shown by the angles alpha and beta respectively. Similarly, the distance between lower lens 30 and detector 34 varies. This focus problem can be corrected by curving the lower lens 30 downwardly (in a toroid shape) toward its ends so that it is closer to the data line at its ends than it is in the center. The lens curvature should be such to satisfy the standard lens formula:

$$1/F = 1/D_1 + 1/D_2,$$

where F is the focal length and $D_1$ and $D_2$ are the respective distances between the lens and the two points of focus, i.e., the paper to lens and detector to lens distances. We have found a 235 mm (9.2 inches) radius of curvature satisfactory for this correction.

In practice the field flattener and lower lens 30 can be molded as a single unit from clear acrylic resin under high pressure (see discussion related to FIG. 19).

THE DATA STRIP

Data strip 3 is shown printed along one side of a sheet of paper 2 in FIG. 10. The usable information on the data strip can be printed in the form of bits of information, but preferably is encoded in the form of "dibits", dual bits. The two forms of acceptable dibits are shown in FIG. 11 and can be either black-white 70 or white-black 72, sequentially. Black-black and white-white are unacceptable to the dibit system and, when read, indicate error. Thus, in the preferred system one bit of information is obtained from each dibit.

FIG. 12 shows the upper end portion of a data strip 3. It includes three sections running across the strip: a horizontal synchronization section 74 at the top, followed by a vertical synchronization section 80, followed by an encoded information portion 86. The first few data lines in portion 86 can provide the "start" read information; alternatively, as shown, this may be accomplished by having a gap between section 80 and portion 90.

Running longitudinally along the left edge of data strip 3 is a solid start line 88, one dibit wide, followed after a one-bit space 89 with a checkerboard patterned alignment guideline 90, one dibit wide (shown in enlarged form in FIG. 13). Running longitudinally along the right edge of data strip 3 is patterned guideline 92, spaced one or two bits 91 from the encoded information and having the configuration shown in FIG. 14. The patterns of guidelines 90 and 92 are congruent with, i.e., in alignment with, the data lines, and, so, both of guidelines 90 and 92 are used by the reader to adjust for a possible tilt (slight non-parallelism of the data line and scanning line) during scanning of the strip.

The encoded information is found in the encoded information portion 86 running between guideline 90 and guideline 92. Each horizontal line of bit areas in that portion is what has previously been referred to as a data line 76. Each pair of bit areas running sequentially along the data lines 76 represents a dibit of information (as shown in FIG. 11) except that, preferably, the end dibits on each end of each data line are used for parity checks.

There are a plurality of data lines 76 of uniform bit areas running transversely across information portion 86 of data strip 3. The lines are of the same width (bit area height) and length; they are parallel and contiguous to each other; the beginnings of the data lines lie in a common line; and the bit areas have data encoded in bit form sequentially along each data line (by presence or absence of printing), and, thereafter, sequentially along the next sequential and contiguous data line. Alternatively, the data may be encoded in any other desired known and pre-determined sequence, and the software associated with the scanner modified accordingly. The totality of data lines forms the encoded information portion 86 running between guidelines 90 and 92.

The number of dibits shown in each data line 76 in FIG. 12 is representative of what might be found in actual practice, but the density could be greater or less.

Horizontal synchronization section 74 and vertical synchronization section 80 will be discussed below, as will various aspects of lines 88, 90 and 92 and the scanning of data. For present purposes, however, it should be noted that the scanning of the encoded data will be from left to right along the data lines 76 beginning with the uppermost line in the encoded information portion 86 and working down to the lower most line. For comparison purposes, note that the direction of scan in FIG. 7 would have the scan line running perpendicular to the paper of the drawing of FIG. 7 and the longitudinal dimension of the data strip would run horizontally and parallel to the paper. Comparably, in FIG. 8, the scan line would run horizontally along the paper, and the longitudinal dimension of the data strip 3 would be perpendicular to the paper. During one scan of encoded information portion 86 the scanner will scan, in this sequence:

(a) A one dibit start line 88.
(b) A one bit space 89.
(c) One dibit of checkerboard alignment guideline 90.
(d) A one dibit parity check.
(e) Numerous dibits of encoded information.
(f) A one dibit parity check.
(g) A one or two bit space 91.
(h) One dibit of guideline 92.

THE SCANNER CHASSIS

Data strip 3 is scanned, i.e. read, as discussed above, by use of reader 1. The data strip is positioned under slot 12 in the bottom of housing 6 of the reader 1. In order for this scanning to occur, it is necessary for a scanner of the general type exemplified by FIG. 7, to move uniformly and precisely down data strip 3, first through horizontal synchronization section 74, then vertical synchronization section 80, and finally through the encoded information portion 86. In doing this, the scanner should be positioned at a predetermined and uniform distance above the data strip, to maintain proper focus, and should move along the strip at a predetermined speed relative to its scanning rate.

Figure 4:
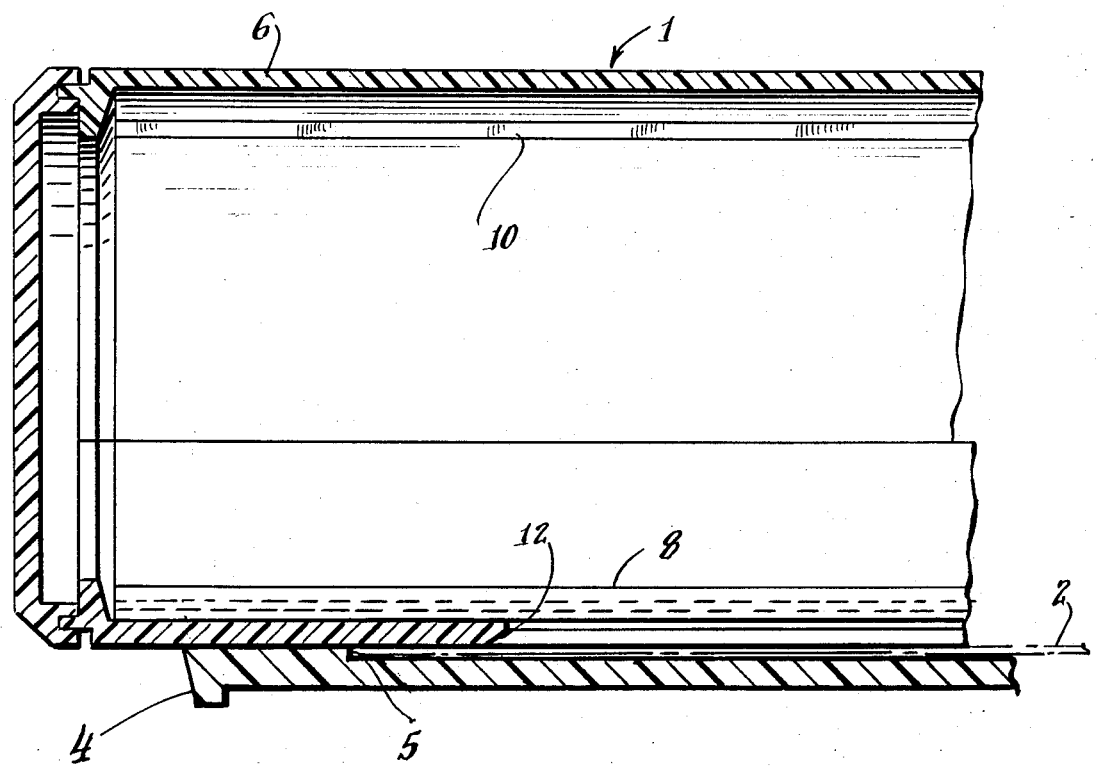
FIG. 4 is a partial vertical section of the reader taken on line 4—4 of FIG. 2.

To this end, the scanner is mounted on a chassis 20 which, in turn, travels on the V-groove, toothed rack (or rail) 8 and rail 9, which have been integrally molded into the lower portion of reader housing 6 (FIGS. 2, 3 and 4).

More details of this chassis structure are shown in FIG. 15 (a vertical section) FIG. 16,(another vertical section), and FIG. 18 (a horizontal section).

The right hand portion of this chassis 20 (as shown in FIG. 18) is carried on rails 8 and 9 by two wheels, geared driving wheel or pinion 24 in rack 8 (located at the back of housing 6) and freely rotatable wheel 26 carried by rail 9 (located toward the front of housing 6).

A principal driving motor 44 is used to drive the drum 40 (FIG. 16). The motor 44 is mounted in housing 20 with its shaft (axis) parallel to rack 8 and rail 9 and slot 12 (FIG. 17). Gear 27 is also on the shaft of motor 44 and drives through reducing gear 28 which in turn operates worm gear 29 (FIG. 18) which drives pinion 24. This drives the chassis. Since drum 40 is also on the shaft of motor 44, the speed of rotation of drum 40 is directly geared to, and synchronized with, the rotation of pinion 24; and, accordingly, the rate at which chassis 20 moves along rack 8 and rail 9 is directly related to the rate of scanning.

Alternatively, wheel 24 need not be geared, in which event rail 8 is not toothed; drive is then achieved through frictional contact.

Chassis 20 rides on a three point suspension made up of driving pinion 24 and a "floating" ball 37 (FIG. 21) at the left end of chassis 20 which rides in the V-groove slot 8 (FIG. 27), and wheel 26 on rail 9. Ball 37 is the molded end of a downwardly spring-pressed arm 38 which is pivotally secured to the rear of chassis 20 at point 39.

Chassis 20 is pressed downwardly into good contact with rack 8 and rail 9 by freely rotating upper wheel 67 (FIG. 15) which is spring-pressed upwardly against upper rail 10 by spring 68.

Accordingly, chassis 40, carrying the scanning equipment, is driven longitudinally of slot 12 along rack 8 and rail 9 by drive motor 44.

Motor 44 is controlled by logic circuit 200 (FIG. 41; see below.) Actuation of motor 44 to control movement of chassis 20 also serves to rotate drum 40 with its upper set of lenses and, consequently, the rate of scanning by drum 40 is synchronized with the rate of motion of the chassis longitudinally of the data strip 3. Since the scanner chassis is continuously moving along data strip 3 during scanning, each of the plurality of scans of each data line 7 will cover a slightly different portion of the data line. (Our preferred scanner moves 0.064 mm down the data strip, and the bits forming the width of the data line are between 0.25 mm and 0.90 mm.)

THE OPTICAL SYSTEM

The system used for scanning the data strip includes a series of elements, all directed to the receipt of dibit information, from each data line, at the principal detector 42.

Essential elements of the optical system, as shown in FIGS. 7, 16 through 20, 22 through 26, 28, 33 and 34, include:

1. The optical drum 40 with its upper cylindrical lenses 33 and its timing controls. Drum 40 includes inner drum 41 with lens openings 43.
2. The lower lens 30 and its associated field flattener.
3. An infra-red light source through light pipe 52. The wavelength of this source is matched to detector 42.
4. An alignment or tilt control mechanism to adjust the angle of lower lens 30 and light pipe 52 so that they parallel the data lines 76 in the data strip 3.
5. Timing pulse control mechanisms for control of scanning rate.

THE OPTICAL DRUM

As discussed with reference to the generalized description of FIG. 7, the upper cylindrical lenses 33 are carried by a drum 40. As the drum revolves, the lenses, each in turn, scan the data line.

Drum 40 is shown in more detail in FIGS. 16, 17, and 22 through 26.

Optical drum 40 has a configuration made up of a generally cylindrical portion 100 (carrying upper lenses 33), and a truncated conical portion 102 leading from the cylindrical portion, truncated by a hub 104. The hub is carried by the rotor of driving motor 44.

The entire unit is molded at high pressure (500 to 1500 atm) from transparent acrylic resin.

In its preferred embodiment cylindrical portion 100 is about 38 mm (1.5 inches) in diameter and about 4.5 mm (0.175 inches) high (width as viewed in FIG. 7); and the truncated cone 102 has a height of about 3.8 mm (0.15 inches) and meets the cylindrical portion at an angle of about 30°. The hub 104 is preferably a separate piece having snap-in legs 106 that provide a fixed snap-fit in opening 108 at the upper end of conical portion 102.

The shaft (axis) of driving motor 44, and so of drum 40, is parallel to slot 12 in the base of housing 6, so that it is parallel to the longitudinal dimension of data strip 3. The shaft is centered over the width of slot 12 so that it will be substantially over the center line of data strip 3 and over the center of each data line 76 in the data strip 3.

A series of cylindrical lenses 33 are integrally molded in the cylindrical portion 100 with their truncated lengths substantially parallel to the shaft of drum 40.

An inner drum 41 fits within drum 40. Inner drum 40 is molded from an opaque, plastic material and has lens openings 43 positioned about lenses 33. This reduces the possibility of stray light reaching the detector.

A detector 42 is positioned within drums 40 and 41, preferably on their common axis. It is held by a carrying frame 110 secured to the chassis. Frame 110 includes a conically shaped aperture 112 (FIG. 26) below the detector to receive the light images from lenses 33. An aperture plate 114, having aperture 116, is held by frame 110 above opening 112 and below infra-red detector 42. The plate is preferably 0.05 mm (0.002 inches) thick with a precise rectangular aperture 0.15 mm (0.006 inches) wide and 0.46 mm (0.018 inches) long. Use of this plate permits sharper delineation of the bits (and dibits) on the data line. It allows the bits on the data line to be more closely packed and still be read accurately.

A printed circuit board 118 (FIGS. 15, 16 and 21) is secured in frame 110 above detector 42. This circuit board receives the output of the detector and includes the pre-amplifier circuit 46. The output from the circuit board goes to a second printed circuit board 120 mounted above it, which board carries the necessary circuitry and LSI chip and computer 48 for control of the various operating mechanisms of the scanner. (See FIG. 41 and discussion below).

It should be noted again that motor 44, which revolves drum 40, is the same motor that, through gear trains, drives wheel 24. As a result, the rate of rotation of the drum is directly related to, and synchronized with, the rate of movement of the chassis 20 longitudinally of the data strip 3.

Cylindrical portion 100 of optical drum 40 carries upper cylindrical lenses 33. These are equally spaced around the periphery of drum 40 and, preferably, there are eight such lenses.

The focal length of the lenses 33, in conjunction with lower lens and flattener 130, is such that the spot being scanned will be in sharp focus on the detector 42.

The design of the optical system is such that the width of the scanning spot is less than the width of the data line being scanned.

LOWER LENS AND FIELD FLATTENER

The lower lens, exemplified by element 30 in FIGS. 5, 6 and 7 is integral with the field flattener, and is molded at high pressure (about 500 to 1500 atm) from transparent, acrylic resin. Alternatively, it may be molded separately and no field flattener used. Absence of a field flattener, however, leads to lack of sharp definition and, consequently, reduces the ability to read small and densely packed bits on the data strip.

This integrally molded lower lens and field flattener unit 130 is shown in partially broken perspective in FIG. 19, and may also be seen in FIG. 16, 22 and 28.

This integral unit 130 includes the convex portion of lower lens 30, the axis of which is positioned to be as nearly parallel to the data line being read as possible (specific alignment means are described below). As best seen in FIG. 19, lens 132 arches upwardly between the ends, in a toroidal shape, to correct the focus problems previously described with reference to FIG. 9; a higher portion of the lens can be seen, identified as 134 in FIG. 19.

The focal length of lens 132 is such as to focus the data line at aperture 114 by detector 42 by means of the lenses 33.

The upper surface 136 of this integral unit 130 serves to provide the optics for the flattener. The flattener is a lens, convex in the longitudinal direction of unit 130, formulated to correct the focus problem of upper lenses 33 over the length of the data line, as explained above in connection with the discussion of FIG. 8. Its radius is less at the center than at the ends.

Accordingly, integral lower lens and flattener unit 130 performs two functions: First, it acts as the lower crossed cylindrical lens; second, it is a "bent" cylindrical lens (toroidal) so that it can correct for the focus problems over the length of the data line that such a lens would have under the standard focus equation (see FIG. 9).

Aperture plate 137 is mounted below block 130 (FIGS. 7, 16, 19 and 28), and has an aperture measuring 0.4 mm by 19 mm (0.016 inches by 0.75 inches), through it may be longer if necessary for larger data lines. Plate 137 serves to eliminate the possibility of scanning undesired areas of the data strip.

The unit 130 and plate 137 are securely mounted in and carried by supporting frame 144. Frame 144 is pivotally connected to chassis 20 at pivot point 160, adjacent to one end of unit 130 (FIG. 22), and the other end of frame 144 rests on flange 162 (secured to chassis 20) for sliding movement along this horizontal flange.

ILLUMINATION OF THE DATA STRIP

The system of this invention preferably utilizes infrared rather than visible light. This requires the use of printing inks for the data strip that absorb infra-red, an infra-red light source, and an infra-red detector; these should be of matched wavelength. The use of infra-red has the additional advantages of improving signal-to-noise ratio and that the data strip 3 may, if desired, be camouflaged by being over-printed with a uniform dark ink or dye that is transparent to infra-red.

The light source 50 and the "light pipe" 52 are generally depicted in FIG. 7. They are shown in more detail in FIGS. 16, 18, 20 and 28, FIG. 20 being a perspective view of the light source and light pipe separate from the unit.

The so-called light pipe 52 is a device for receiving the infra-red output from LED 50 and carrying it to a point just below the lower lens (integral unit 130), and spreading it laterally, so that the infra-red light is concentrated on and over the length of the data line being scanned.

Accordingly, light pipe 52 has a narrow upper end 150 facing LED 50 and has fan-shaped sides 152 leading arcuately down to its lower end 154. This lower end is greater than the width of the scan and projects the light on the line being scanned. The pipe 52 and LED 50 are held in the same supporting frame 144 as is integral unit 130, so there is no relative movement between the source of illumination, the lower lens 30, and the aperture 137. Adjustment of the angle of one relative to the data line being scanned, as described below, equally adjusts the others.

The sides 152 of the light pipe fan outwardly from the LED at, or at less than, the critical angle. The angle is such that, for the infra-red wavelength used, the extreme rays striking the side of the light pipe are reflected back and forth so that they reach the end of the light pipe in the center of lower end 154. The result is that the light pipe 52 provides uniform illumination of the data line being scanned. By "critical angle" is meant the angle at which the light will be reflected internally in the pipe rather than passing out through the edge of the pipe. This angle can be readily determined by one skilled in the art from the index of refraction of the material from which the light pipe is made.

Preferably light pipe 52 is made of transparent, molded acrylic resin. Its upper end 150 can, if desired, be molded integrally with a holder for the LED 50 to assure accurate and consistent placement of the LED.

SCANNING ALIGNMENT CONTROL

The data lines 76, running transversely of the data strip, should be scanned in a direction as nearly parallel to the lines as possible. The data lines are scanned along a scanning path determined by the position of lower lens block 130 and aperture 137. If the angle between the data lines and the scanning path is too great, a particular scan may scan bits partially from one data line and partially from the adjacent line. Even though each line is generally scanned three or four times, leaving the central lines being scanned by themselves and not in conjunction with adjacent lines, the more nearly the scanning path is parallel to the scanning lines, the more "good" scans result, giving a better choice of scan lines to read. Also, in the event that there has been some destruction of one data scan, as determined by parity check, it may be possible to use another line, so the more usable scans of a data line that exist, the better likelihood there is for an accurate reading of that line.

To this end, the nearer the lower lens 30, i.e., the integral unit 130, is to being parallel to the data line being scanned, the better.

Accordingly, a "tilt" or alignment adjustment is provided. This adjustment involves control of the angular position of supporting frame 144, as pivoted about pivot point 160, since the frame carries both unit 130 and light pipe 52 (see FIGS. 18 and 22). Tilt adjustment is accomplished by rotation of supporting frame 144, about pivot 160 with the end of frame 144 distant from the pivot resting on horizontal flange 162. As designed, the alignment adjustment possible is about plus or minus 1.7°, which appears to be adequate to control necessary tilt adjustments.

When the data strip is first placed under the scanner, the scanner makes initial tilt control adjustments based upon readings made from the horizontal synchronization section 74 of data strip 3 (FIG. 12); it also makes readings from checkerboard alignment guideline 90 and guideline 92 as it proceeds through the vertical synchronization section 80 and the encoded information area 86.

From these the computer determines the "tilt", if any, of the data strip when initially placed under reader 1, and makes continuous comparable readings as it is reading the encoded data. The computer is programmed to operate the tilt adjustment mechanism and so rotates supporting frame 144 to compensate for any misalignment.

As seen in FIG. 18, frame 144, carrying light pipe 52 and lower lens and flattener block unit 130, is mounted for pivotal movement about pivot 160, relative to chassis 20. As viewed in FIG. 18, frame 144 is spring-pressed in a clockwise direction. A constant-speed tilt motor 164, secured to chassis 20, drives reducing gear 166 which in turn drives gear 168, both of which are mounted on chassis 20. Gear 168 includes a spiral groove on its upper surface, preferably seven spirals. An L-shaped arm 172 pivoted at 174 has a finger at its outer end projecting into the spiral grooves 170. The preferred ratio between motor rotation and rotation of frame 144 is about four thousand to one, accomplished by reducing gears 166 and 168 and the reduction achieved through spiral 170 and the lengths of the arm members of L-shaped arm 172 about pivot 174.

As gear 168 rotates, the finger moves within grooves 170 radially inwardly or outwardly, depending upon the direction of rotation of motor 164. The opposite end of L-shaped arm 178 includes an upstanding stud 176 which presses against horizontal flange 178, which itself is riding on chassis flange 162. Actuation of motor 164 causes pivoting of arm 172, which in turn causes pivoting of supporting frame 144.

The extent of adjustment is controlled by the direction of rotation of motor 164 and the length of time of rotation, since the motor is of constant speed.

Tilt adjustment is computer controlled by logic circuit 200 (FIGS. 29 and 41). At start-up the reader driving motor 44 operates in reverse, moves chassis 20 to the "home" position, i.e., to the beginning end of data strip 3 just above the bars 17 of horizontal synchronization section 74. Motor 44 then reverses and commences scanning at a predetermined initial start-up speed. Chassis 20 then starts moving down the strip, and the scanning operation commences rotation of optical drum 40. It scans to locate the beginning of the strip, i.e., the upper ends of the bars in horizontal synchronization section 74. The unit is programmed to seek at least four "intersections" (changes from black to white bars, or vice-versa) and an even number of intersections for six scans in a row. This identifies the horizontal synchronization section 74. The two sides of section 74 are mirror images and so the center of the strip is determined by measuring the full width of the strip in terms of scanning time.

Motor 44 is then reversed, the scanner carried to the beginning of the strip, and readings taken. By comparing the amount of black on the left side of the strip with the amount of black on the right side of the strip (as determined by scanning time of each), the extent to which the strip is tilted relative to the scanner can be computed. The scanner tilt adjustment is actuated by actuating motor 164 in the proper direction for a given period of time. The motor is reversed, carrying the scanner again to the beginning of the strip, and a new reading taken. If tilt adjustment is satisfactory, the scanner continues to the vertical synchronization area 80; if not, the process is repeated until tilt adjustment is satisfactorily made.

The number of bars in the horizontal synchronization section 74 is representative of the number of dibits in each data line 76, and, accordingly, this information is entered into the computer 48 for use during scanning.

The next section of data strip 3 is the vertical synchronization section 80. Here the height of the dibits in each scan line is encoded by means of a dibit code. The preferred code provides an 8-bit number, giving a total of 256 possible bit area heights. This means that the height of the bit areas may be encoded in increments of 1/16 of a scan, i.e., from 1/16 to 15 15/16. The scanning is then set in the computer to the nearest sixteenth of the height of the bit areas. Other codes and incremental height adjustments may be used, if desired.

TIMING CONTROLS

Proper synchronization of the scanning by the lenses 33 on drum 40 requires two kinds of control: First, position control of the scanning lens 33 relative to the portion of the data line being scanned at a given instant, and, second, adjustment of the rate of readout as a line is scanned in order to correspond with the number of dibits of encoded information (and parity check dibits) on each data line. For this purpose optical means are provided to obtain readings related to the position of the scanning lenses, for internal synchronization of logic circuit 200.

These two timing means are best seen in the overall view in FIG. 17 and in the generalized view in FIG. 7.

Greater detail is shown in FIGS. 22 through 26, 33 and 34.

Determination of the position of each lens 33 at the start of its cycle is accomplished by the interruption of a light beam by a spoke or chopper 58 on the periphery of inner drum 41. Choppers 58 are molded as part of inner drum 41 but extend from it radially and beyond drum 40. The light source 54 is directed to lens position detector (start detector) 56, and source 54 and detector 56 are positioned so that the light beam going to detector 56 will be interrupted by spokes 58 on the periphery of drum 40. There is one spoke 58 for each upper scanning lens 33, and each spoke is in the same position relative to its respective lens. To the extent any slight errors exist in placement, for example due to slight inaccuracies in the mold, the computer can be programmed to adjust for that variance.

Interruption of the light beam by spokes 58 is detected by start detector 56 and the information fed to logic circuit 200, which is programmed to start the reading sequence of a given data line at the proper time. The start of the scan is adjusted in each scan cycle by the scanning of start line 88. Use of choppers 58 however, avoids a false "start" signal which might arise from, say, a speck of dirt on or near one of lines 88, 90.

In operation of logic circuit 200, it is necessary to have a clock circuit. The clock circuit determines the rate at which data is read from data strip 3. In this instance, however, the clock circuit should not be an independent clock, but should be synchronized with the rate of rotation of drum 40. This is done mechanically by the production of timing pulses resulting from light pulses created by timing lines on the drum. Timing lines 61, which interrupt light from LED 54 as the light passes to timing pulse detector 62, are generally indicated in FIG. 7. A specific preferred structure is shown in FIG. 17, in association with FIGS. 23 through 25 and 33 and 34.

Referring most particularly to FIG. 17, it will be noted that the same LED 54 is used as is used for the start detector 56. The light beam passes through the conical portion 102 of drum 40, through moire mask 64, and then to timing pulse detector 62. The output is fed to logic circuit 200.

It has been found that a convenient number of timing pulses is 20 per scanning lens 33; and so drum 40 is molded with 160 uniformly spaced, radial timing lines 61 in conical portion 102. (FIG. 23).

These timing lines could simply be molded areas of zig-zag cross-section breaking the light beam. Greater definition is achieved, however, by using a moire effect. This is accomplished by using a moire screen 64 (FIGS. 13, 33 and 34) with radially placed slots 65 and also by having the radial timing pulse marks 61 formed of convex shape to focus the detector 62 or the light from LED 54 directly on the plane of screen 64. Slots 65 are spaced to match and complement marks 61. In this way the focused light from a series of timing pulses passes through the radial slots 65 in the mask at the same instant, giving a greater intensity of pulse and better timing control.

It is necessary to have the clock pulses in the logic circuit 200 correlated with the number of dibits on a particular data line. This is done by having the computer program make an adjustment to the clock rate. The adjustment is made by having a standard initial clock rate per timing slot pulse N, such as 100, where N is the number of clock pulses 65 between successive timing slot pulses 68. Since there are physically 20 pulses arriving at the timing pulse detector 62 for each lens, this initial standard would provide 2000 pulses per lens. The physical width of the data line (including start line 88, the bit space, checkerboard line 90, the data line of encoded data and stop line 92) is then measured in terms of clock pulses and noted. The number of dibits that have been encoded in each data line 76 has been determined through the information encoded in horizontal synchronization area 74. The number of clock pulses for each data line is then divided by the number of bits to determine the actual number of clock pulses per bit. Since a predetermined number of clock pulses per bit is required for actual scanning, a tentative number, the ratio of clock pulses per timing pulse "N", such as 128, must be adjusted, i.e., $$\frac{128}{\text{Actual pulses/bit}} \times N = \text{New ``}N\text{''}$$

The computer program changes the number of clock pulses per timing pulse accordingly. (Note FIG. 41).

SCANNING THE DATA STRIP

Beginning the Scan

The scanning cycle begins with the scanner above the start of the horizontal synchronization section 74 at the beginning of data strip 3. When the motor 44 is started, continuous scanning begins. Initially the only thing "seen" by the scanner is white. However, as soon as the black and white regions of the horizontal synchronization section 74 appear, an output waveform is generated. Assume, for example, a scan along the line $S_1$ of FIG. 12. Such a scan would generate the waveform $S_1$, shown in FIG. 35, from the amplifier 46. (In this and succeeding waveforms, black is shown as the higher level and white as the lower.)

Referring to the curve $S_1$, there is an initial enlongated peak $LB_1$ which represents a time between scans during which no lens is "looking" at the strip. This region is referred to arbitrarily as "long black". A similar region $LB_2$ exists at the end of scan $S_1$. In between these regions, are two series of four peaks each which correspond to the black regions of the horizontal synchronization section 74 encountered in a scan along the line $S_1$. The $S_1$ output from the amplifier is converted into a corresponding squarewave $S_1'$ by the comparator 47.

Horizontal synchronization section 74 has several functions. One function is to signify that scanning the strip has started. This is done by counting the pulses of waveforms $S_1'$ between the long black signals $LB_1$, $LB_2$. If there are an even number of pulses, if that number is greater than three, and if the number is consistent for at least six scans, the beginning of a data strip is indicated. Until such a condition is met, the scanner continues to scan for a total of 256 scans. It will then return to the beginning and stop. In the FIG. 35 illustration, there are eight pulses along scan $S_1$, signifying that scanning the strip has started. A flow chart embodying strip start verification is illustrated in FIG. 43.

Coarse Tilt Adjustment

The tips of the black bars in section 74 are used to measure the amount of tilt. This is done by measuring the amount of time on each side of the centerline of the strip that the scanner is receiving a black indication. If the scan is approximately perpendicular, these times will be roughly equal. Accordingly, it is necessary to locate the center of the strip. This is done by a phase lock loop counter which counts the distance travelled in each scan from an arbitrary "start" location as illustrated in FIG. 12. The distance $T_1$ to the lefthand start bar 88 and the distance $T_5$ to the righthand bar 92 are measured. The distances $T_1$ and $T_5$ are shown to the front of the beginning and last bars because the counter output is read only at a white to black transition. However, for practical purposes, this may be ignored and the "forward" center of the data strip 3 is $$\frac{T_5 - T_1}{2} + T_1.$$

It will be understood that the T distances are actually represented by counts of a phase lock loop counter. Thus, the number of counts for any given distance is actually arbitrary. The number of counts per timing line 61 is a programmable value known as the "phase lock loop value".

A tilt alogrithm is employed which sums the times on each side of the centerline that black is read during a given scan. The flow chart of FIG. 44 incorporates the alogrithm. Assume, for example, a scan which just skims the tops of the bars in section 74. In the case of tilt, some of these bars would be missed. The scanner first proceeds down to a scan such as $S_1$ which is totally within the section 74 and measures a reference time on each side of the centerline. The motor 44 is then reversed and, as the scanner travels backwards, a new "reverse" center is established and the times are measured. The top of the strip has been passed when the sum of the times is less than half the reference times.

Tilt is measured in units of scan. For example, if the first scan indicates black on both sides, the second scan indicates black on the left and white on the right, and the third scan indicates all white, there is one scan of tilt. An indication of zero scans of tilt would be a scan that indicates white on both sides followed by a scan that indicates black on both sides. This technique gives the direction of tilt and some idea of the angle. If the result indicates, for example, two scans of tilt, the tilt motor 164 would be run for a period of time and in the direction that would be expected to correct for two scans of tilt. The tilt motor is then shut off. The scanner then reverses and measures tilt again, employing the forward center previously obtained and the same reference times. If the tilt measures zero, the scanner proceeds. However, if the tilt is not zero, the scanner reverses and goes through another correction cycle. This cycle is repeated a maximum of four times and thereafter the scanner proceeds.

Horizontal Synchronization Content

As the scanner proceeds down the strip it will remeasure the number of intersections in section 74. Encoded in the number of intersections is the number of half bytes per scan that will be read in the data information area 86. An "intersection" is defined as a transition from white to black. In the strip illustrated in FIG. 12, the horizontal sync section 74 will be seen to have eight intersections — four of these intersections being inherent from the presence of the edge bars 88, 92 and heavy bars 201, 203. The number of intersections plus 4 and divided by 2 gives the number of nibbles (half bytes). The illustrated strip has six nibbles or three bytes per scan. This information is stored for future use.

Contrast Measurement

Another task accomplished through section 74 of data strip 3 is that the illumination intensities from the black and the white regions are measured and averaged in order to set parameters by which to recognize black and white regions throughout the remainder of the data strip 3. For the purpose of measuring white, eight different scans are made across the strip above horizontal synchronization section 74 while scanning backwards. On each scan a reading is taken at a different position across the strip, one of the readings being taken at the center of the strip.

The illumination intensity from wide black bar 201 is measured. Eight different measurements are made and summed. The black/white difference is then calculated from $$\Sigma_1^8 \text{ black intensity} - \Sigma_1^8 \text{ white intensity},$$

using the white measurement previously obtained. This difference is then utilized to establish recognition parameters.

Strip Reference Measurements

Certain additional information is also stored to compensate for the fact that the eight lenses 33 are slightly different from one another. The additional information is measured for each lens and includes $T_1$ which has already been described and $T_5$ which is the distance from "start" to the last intersection. A term $BT_1$, known as "bogus" $T_1$, which is the distance from the start line to the first heavy bar 201, as illustrated in FIG. 12, is also stored. The duration, or width $T_2$, of start bar 88 is also measured and stored. The measurements are made and stored for eight consecutive scans. Medians are established for $T_5$, and for $2T_2$ using $BT_1 - T_1 = 2T_2$. This is done for each lens. If either $BT_1$ or $T_1$ does not correspond to a previously determined reference, the other is used in subsequent calculations. Thereafter the median $T_1$ is subtracted from median $T_5$ to yield $T_3$, the width of the strip. This cycle is repeated and the results averaged for $T_1$ and $T_3$.

Scan Start Determination

It is important to predict accurately a starting point for each scan line. By starting each scan at a predicted, rather than a perceived, location, the influence of a scratch or an extraneous smudge of dirt will be essentially nullified.

$$T_1 + T_2/2$$

would be the midpoint of start line 88. Since $2T_2/4$ represents the width of a bit and since the start line 88 is two bits wide, the leading edge of that line is represented by the midpoint minus the bit width or $$T_1 + T_2/2 - 2T_2/4$$

The phase lock loop value is recalculated based on the number of nibbles and the strip width, $T_3$, in order to establish the width of a dibit as 128 phase loop counts. The various T values are then adjusted for this scale.

The phase lock loop counter becomes the horizontal "yardstick" which measures horizontal distances transverse to the longitudinal axis of the strip. The speed of motor 44 is then adjusted in accordance with strip density to maximize the rate of data output.

Vertical Information

The vertical yardstick is the motion of the scanner. The distance moved by the scanner between individual scans is, in one application, 0.0635 mm. That distance, although something of a misnomer, is referred to as a "scan". The unit measurement in the vertical direction is 1/16 scan or, in this embodiment, 0.004 mm.

Vertical synchronization section 80 of data strip 3 supplies information about the height of the data bits contained in the information area 86. The information is encoded in the form of bytes. The bytes are repeated across the width of the strip and these bytes are illustrated as $B_1$, $B_2$, $B_3$ in FIG. 12. The vertical synchronization section 80 is scanned until at least two consecutive scans yield corresponding information revealing the number of scans per line of data, the "scan Period". The remaining vertical distance of the section 80 is used to provide computer time to start the filters, make two proportional tilt corrections, and start the predictor, all as described below.

Bit Center Evaluation

In order to read down the length of strip, various "vertical routines" are employed. These routines make the proper adjustments to each of the eight $T_1$s in order to correctly time the start reading of the data information. Another requirement is the establishment of "filters" down the left and right sides of the strip. The term "filters" as employed herein does not refer to physical, suoh as optical or electrical filters, but has a specialized meaning. Ic refers to a computer algorithm which takes a sequence of numbers as an input and generates another sequence of numbers as an output. This is known as a "nonrecursive digital filter" or a "finite impulse response matched filter."

In order to correct for tilt and to predict the center of the bit, a checkerboard 90 down the left side of the strip provides the input to one filter and a sawtooth 92 down the right side of the strip provides the input to another filter. The combined information from checkerboard 90 and sawtooth 92 is employed to obtain information about tilt. The flow chart for the filter algorithm is shown in FIG. 49.

To understand the derivation of tilt information, reference may be had to FIGS. 12, 36, and 37 and to the flow chart of FIG. 45. On FIG. 12, there is indicated one scan line $S_n$ which runs through a black/white segment of checkerboard 90 and later through a black/white segment of sawtooth 92. Immediately below that scan line $S_n$ is illustrated a second scan line $S_{n+1}$ which passes through a white/black portion of checkerboard 90 and a black/black portion of sawtooth 92. Each of these scan lines represents a family of a number of parallel scans closely parallel thereto. A transition from black to white as seen in checkerboard 90 by scans $S_n$ represents a negative number. Conversely, a transition from white to black represents a positive number. The outputs from sawtooth 92, however, all represent positive numbers having values proportional to the length of the black portion. Accordingly, black/white represents a positive number and black/black represents a more positive number.

It will be seen that an output built up from the results of scans taken around scan line $S_n$ will alternate from positive to negative. When these outputs are combined from a series of scans, $S_1$ $S_2$ $S_3$ . . . $S_n$ through checkerboard 90, there is generated the curve of FIG. 36 part(b) which alternates around zero in the manner of an alternating current.

The curve generated from scans through sawtooth 92 is similar but, since the output from sawtooth 92 is either positive or more positive, there results a DC wave with an AC component as embodied in the curve of FIG. 36 part(a). The waveforms of FIG. 36 are utilized as filter inputs. From the standpoint of tilt measurement, it is important to note that the waveforms are in phase. This indicates the absence of tilt. In the presence of tilt, these curves would be out of phase. The waveforms illustrated in FIG. 36 are not squarewaves because the scanning spot is not infinitely small. In order to extract pertinent information while ignoring noise which may be present, the actual waveform produced is the result of averaging several scans, typically sixteen.

Another function of the waveforms of FIG. 36 is that they make possible a prediction of the location of the center of the bits being scanned. As several scans will be made through each line of bits, it is desirable to accept scans that pass through the centers of the bits and reject those near the edge. This provides the maximum probability of obtaining reliable information from each line of data. This information may be obtained from the absolute phase of one or the other of the signals of FIG. 36 with the signal of FIG. 36 part(b) preferred. The filter inputs of FIG. 36 yield sawtooth outputs similar to those shown in FIG. 37.

Tilt Correction

Since curves (FIG. 37) are being generated, it is interesting to note that, through interpolation along the slope enough information is being generated to determine the tilt to an accuracy better than the spacing from one scan to the next, even though sampling at one scan intervals. As illustrated in FIG. 37, there is a phase difference between the two waves. From the sawtooth waveforms of FIG. 37, it is possible to find the center of the bit by determining where the output of the filter crosses zero. That is likely to occur between two scans and, since the output of the filter in that area is linear, we can examine the two scans surrounding the zero crossing and interpolate to find the exact scan number of the zero crossing.

In FIG. 37, scans are represented by the vertical lines labelled $S_1$, $S_2$ . . . $S_6$. It is noted that waveform (a) which represents the filter output from one side of the data strip 3 indicates a zero crossing at approximately 1.4 scans. Similarly, we determine from waveform (b) that the zero crossing from the other side of the strip occurs at approximately 1.9 scans. Subtracting, we can determine that the tilt of the scanner in this case is $-0.5$ scans. This information is employed to drive the tilt motor 164 to give a correction.

Bit Center Prediction

The second function of the filters is to predict where the vertical center of a bit, (i.e., the center in a direction transverse to the scanning direction) is located so that scans near the center may be accepted and scans near the edges may be rejected. As it is impossible to know where the center is located in advance, we must generate a "predictor" of where the center of the bit may occur. This is accomplished as shown in the flow chart of FIG. 46 by locating two scans that straddle the center, for example, scans $S_1$ and $S_2$ of FIG. 37 part(a). We know these scans straddle the center because one of them gives a positive and the other a negative readout. (The filter employed has a 90° phase shift.) The center was determined to be at 1.4 scans. If the scan period is four, we can predict that the next line of data will have its center at 5.4 scans. Knowing that, the output of the 5th and 6th scans can be analyzed to correct the predictor.

Parity Check

The invention includes a parity check. Basically, an extra bit is added to a block of data. That bit indicates whether the sum of the individual data bits is even or odd. When the data is received, the bits may be summed and compared with the parity bit to see if the data came through properly.

The parity check will indicate that one data bit has been altered. If two data bits are altered, the parity will check. In order to overcome this problem, two parity bits are used for each line of data and each represents alternate data bits. For example, there is illustrated in FIG. 38, a line of data bits D with two parity bits $P_1$ and $P_2$, one at each end. The parity bit $P_1$ represents the sum of the values of data bits $D_1$ and the parity bit $P_2$ represents the sum of the values of alternate data bits $D_2$. By use of this technique, if two adjoining data bits should be destroyed, the error can be detected.

While the parity check referred to above will disclose the existence of an altered data bit, it still does not identify the defective bit. In order to make this determination, a threshold is set and the amplitude of the signal coming from each bit is examined. If the amplitude of the signal is greater than the threshold, it is assumed that the bit is correct. If the amplitude is less than the threshold, it is assumed that the value of the bit is unknown. As a result, if it is determined from any particular line of data that (1) parity does not check, and (2) there is an indication of one defective bit, then that bit can be changed and the probability is that the change will be in the right direction. If parity checks, it can be assumed that the line was received correctly, even though it is determined that one bit is defective. This parity check is embodied in the flow chart of FIG. 48.

Threshold Adjustment

It will be recalled that each dibit in the data strip represents a "one" or a "zero". For example, a black/white dibit represents zero and a white/black dibit represents one. The scanner must be able to determine the difference between the densities of the black and white portions of each dibit. Measurement of density difference between black and white makes it possible to avoid many inaccuracies that might arise if only the absolute densities were measured.

Densities are measured by taking from the preamplifier a voltage representing intensity of the light reflected from the strip and using that to control a voltage controlled oscillator which, in turn, runs a counter. In other words, the higher the voltage, the higher the rate of the oscillator, and the more counts produced in a given period of time. This period of time, known as the "data filter", determines the area of the output waveform being integrated. Since this results in the integration of an area in the bit, rather than a measurement of a single point, it greatly reduces the possibility of obtaining a false reading. For example, a scratch through a black bit would have a negligible effect on the total integrated signal.

The difference technique is illustrated in FIG. 39. FIG. 39 part(a) represents a "zero" and a "one" dibit. FIG. 39 part(b) represents the corresponding waveform produced by the scanner the shaded portions representing the integrated areas. FIG. 39 part (c) represents the corresponding count. In this example, black is represented by 10 and white by 2. The first number is always subtracted from the second number in each pair, resulting in a value of $-8$ for the first dibit and $+8$ for the second. The black/white or white/black sequence determines the sign of the number and density difference determines its absolute value. A threshold may be set to verify or question the validity of the output. For example, if this threshold were set at 5, and the first dibit produced values of $-5+2=-3$, the output would be questionable.

Horizontal Centering

Throughout the foregoing discussion, it has been assumed that the location of the center of each bit is known. This, however, is not a good assumption. While it may be true at the beginning of a scan, due to the accurate location of $T_1$, it is almost impossible to predict the accuracy of the location of a bit further across the strip. Accordingly, "centering filters" are used to sample the edge of each bit and correct the position of the data filters.

Referring to FIG. 40, there is illustrated in (a) the pattern for two dibits and in (b) the output waveform from the dibits. If the centering filters are centered on the edges of the first black bit, half black and half white would be seen from each filter. Assuming that black is 10 and white is 2, the outputs would be 6 and 6 with a net difference of 0 as illustrated. Assume, however, that in the next bit the measurements occur too soon. Assuming that the results are 4 and 8 as illustrated, the differences would be +4; thus the sign and the magnitude of each number indicate whether the measurement is taken early or late. In either event, the time of taking the measurement is adjusted by moving the centering filters which also move the data filters. Accordingly, the invention continually strives to position the data filters on the centers of the bits.

There are four possible sequences of bits upon which centering filters may be located: W-B-W, B-W-B, W-B-B-W, B-W-W-B. On a single bit, active filters must be one bit apart. On a double bit sequence, the active centering filters must be two bits apart. If two successive dibits have the same value, that indicates that the second bit of the first dibit differed from the first bit of the second dibit. For example, FIG. 42 illustrates a sequence of four dibits having values of 1011. The last two are similar; accordingly the active centering filters ("CF") F and G must be located one bit apart to focus on a bit edge. However, when two successive dibits have different values, the active centering filter must be those located two bits apart, as C and E. Each data filter is positioned one half bit from a centering filter. Center filter placement is shown in the flow chart of FIG. 47.

Readout Sequence

A data synchronization character is recorded at the very beginning of the information area 86 of the data strip 3. Following that are two bytes that indicate the number of characters contained on the particular strip. Thereafter, every byte of information from the strip is transmitted to the host computer. Throughout the readout, tilt adjustments and predictor corrections continue to be made. Every sixteen scans, the phases of the left and the right sides are compared and, if required, an incremental tilt correction is made. The reason for waiting for sixteen scans is to empty the filter of previously stored data.

Scanning Control Chip

FIG. 41 is a block diagram of a chip usable in the present invention. Logic circuit 200 has four inputs. The "scan" input is the output from the detector preamplifier of the scanner. "Long black" is a signal derived from the chopper or spokes 58 on the rotating drum and indicates when the scanner is between lenses. The "tic" input is from the timing lines 61 on the rotating drum 40. Finally, there is an input called "slice" which is the scan signal after being passed through a comparator.

The tic signal drives a clock circuit 202 comprising a voltage controlled oscillator 204, a phase lock loop 206, and a master clock generator 208. The clock circuit 202 is essentially a frequency synthesizer which will generate a programmable output multiple of the tic signal frequency. For example, the binary equivalent of 100 might be loaded into the master clock generator and it would then produce an output 100 times the frequency of the tic input. The master clock generator runs all the timing and may be programmed to produce a given number of clock pulses for each dibit. Furthermore, if the motor speed varies as for example, from being under load, the clock frequency will change proportionately. This insures, for example, that when clock pulse 1,000 is reached on each scan, the scanner will have reached the same location on the data strip.

The tic signal also controls the speed of driving motor 44 through the motor control circuit 222. Motor control circuit 222 is programmable from microcomputer 48.

Two counters are run off the master clock generator 208. One of these is phase lock loop counter 210. This counter is activated prior to the scan by the long black signal. When the long black signal goes from high to low, the phase lock loop counter 210 resets and begins to count clock pulses from the master clock generator. Whenever a white to black transition occurs on the "slice" signal, the number in the phase lock loop counter 210 (which represents the distance travelled in the scan) is put into a latch, the computer can read the contents of that latch until the next white to black transition occurs, at which time a new number is stored. This gives the computer the capability of measuring the distance from an imaginary point on the left-hand side of the strip to any white to black transition. A black duration counter 212 counts only while the scanner is reading black to indicate the width of a line. When it stops, its value can be read by the computer.

These counters are used only during the beginning of the strip prior to the reading of the information portion 86 except that duration counter 212 continues to monitor sawtooth 98 for tilt information. Upon entering the data read portion of the strip, the scan input becomes effective. The scan input is digitized by an analog-to-digital converter comprising a voltage controlled oscillator 214 and counters included in the blocks titled "data filters" 216 and "centering filters" 218. As previously explained, these are not filters in the physical sense, but are primarily counters and subtractors. A "filter timing" subcircuit 220 receives on each scan the long black signal which initiates the timing sequence. This circuit then determines at which point in the scan the centering filter and data filter measurements will occur. It will be noted that a feedback signal is supplied from the centering filters 218 to the filter timing circuit 220. This loop constantly keeps the centering and data filters centered on the bits throughout the scan as previously explained.

The computer utilizes information from the data filters 216 as the primary carrier of information data stored in the data strip 3. It receives information from the centering filters 218 to indicate whether the scan started at the correct location. The centering filters provide the computer with a centering error signal relative to the black start bar 88 on the data strip such that it can modify the starting time of the filters on each successive scan This is the procedure that permits the accommodation of a tilted strip wherein each scan must start slightly earlier or later than the previous scan.

Communication circuit 224 receives data encoded by the chip 20 and microcomputer 48 and converts it to a form readily interpreted by the host computer.

What is claimed is:

1. An apparatus for scanning data encoded in bit form on a planar data strip, said data strip having a series of data lines of bit areas running transversely across said strip, said data lines being parallel to, contiguous with, and conterminous with, each other, whereby the totality of said lines defines the length of said strip, said encoded data being sequentially encoded along each said data line and thereafter along the contiguous said data line, said apparatus including, a chassis adapted to be positioned proximate to said data strip, a first cylindrical lens mounted on said chassis parallel to the plane of said data strip and parallel to said data lines, and means for moving said chassis longitudinally of said strip, at least one second cylindrical lens mounted in said chassis parallel to the plane of said data strip and perpendicular to said data lines, and means for moving said second lens transversely along said first lens, a detector mounted on said chassis at the focal point of said lenses relative to said data strip, whereby bit areas on a given said data line are focused in sequence on said detector and said data lines are focused in sequence on said detector.

2. An apparatus for scanning data as set forth in claim 1 including means for synchronizing the rate of movement of said lenses relative to each other and in which said means for moving said lenses moves said second lens relative to said data strip and to said first lens sufficiently more rapidly than said first lens such that said second lens scans each data line a plurality of times before said first lens moves to said contiguous data line.

3. An apparatus for scanning data as set forth in claim 2 including means for selecting one of said plurality of scans of each said data line.

4. An apparatus for scanning data as set forth in claim 1 including a plurality of second lenses mounted for sequentially scanning said data lines.

5. An apparatus for scanning data as set forth in claim 4 in which said second lenses are mounted on the periphery of a drum mounted on said chassis for rotational movement, said drum having an axis parallel to said second lenses, and in which said detector is positioned within said drum.

6. An apparatus for scanning data as set forth in claim 5 in which said second lenses are equally spaced about the periphery of said drum.

7. An apparatus for scanning data as set forth in claim 5 including a field flattener associated with said first lens and in which said first lens is curved to more accurately focus all of said bit areas on a said data line upon said detector.

8. An apparatus for scanning data as set forth in claim 7 in which said first lens and said field flattener are molded of transparent plastic to form an integral unit.

9. An apparatus for scanning data as set forth in claim 8, including an aperture mounted below said unit.

10. An apparatus for scanning data as set forth in claim 8 in which said integral unit is pivotally mounted on said chassis for rotation about an axis perpendicular to the plane of said data strip and including means for rotating said unit about said axis, whereby said unit may be positioned with said first lens aligned with said data lines.

11. An apparatus for scanning data as set forth in claim 5 including a motor on said chassis coupled to said drum for rotation thereof and to said means for moving said first lens to effect synchronization of the rate of movement of said first and second lenses relative to each other and to said data strip.

12. An apparatus for scanning data as set forth in claim 11 in which said chassis is on wheels, at least one of which is coupled to said motor whereby said motion of said first lens is synchronized with said movement of said chassis.

13. An apparatus for scanning data as set forth in claim 1 including an infra-red light source positioned to illuminate said data line being scanned and in which said detector is an infra-red detector, the wavelength of said source being matched with the wavelength sensitivity of said detector.

14. An optical scanner utilizing the principle of transversely crossed cylindrical lenses moving relative to one another to determine point focus for reading parallel data lines of bit areas from a data strip, including,
  a chassis, means for supporting said chassis proximate to said data strip, and means for moving said chassis longitudinally of said data strip,
  a first cylindrical lens mounted on said chassis parallel to the surface of said data strip and to said data lines,
  a drum rotatably mounted on said chassis above said first lens, the axis of said drum being parallel to the surface of said data strip and perpendicular to said first lens,
  means for rotating said drum,
  said drum including a plurality of second cylindrical lenses in the periphery thereof and parallel to the axis of said drum, and
  a detector at the focal point of said first and second lenses for receiving information from said bit areas from said data lines,
  whereby said data lines are scanned as said chassis moves along said data strip.

15. An optical scanner as set forth in claim 14 in which said detector is positioned within said drum at the axis thereof.

16. An optical scanner as set forth in claim 14 including a field flattener positioned in association with said first lens, said field flattener having a sufficiently greater focal length at its ends than in the central portion thereof, such that all bit areas along a said data line positioned parallel to said first lens are focused by said first lens at said detector.

17. An optical scanner as set forth in claim 16 in which said first lens is curved arcuately towards the ends of said data lines to compensate for the varying distances of said second lenses on said drum from end to end of said data lines.

18. An optical scanner as set forth in claim 14 in which said second lenses are equally spaced around the periphery of said drum.

19. An optical scanner as set forth in claim 14 including means for detecting the position of said second lenses as said drum rotates and synchronizing the said positions of said second lenses with scanning of said data lines.

20. An optical scanner as set forth in claim 19 in which said position detecting means includes a plurality of light choppers, one said chopper for each said second lens, each said chopper being positioned on said rotatable drum in the same relative position as its respective said second lens, and a light source and related chopper detector positioned for interruption of said source by said choppers.

21. An optical scanner as set forth in claim 14 including an infra-red light source mounted on said chassis and positioned to illuminate said data line being scanned and in which said detector is an infra-red detector.

22. A reader for a data strip, said data strip including an information portion having a plurality of contiguous, parallel data lines of encoded bit areas, said data lines being perpendicular to the longitudinal dimension of said strip, the improvement in said reader including,
  a chassis, means for positioning said chassis proximate to and aligned with said strip and means for moving said chassis along said strip in a direction perpendicular to said data lines and longitudinally of said strip,
  a detector carried by said chassis,
  a first cylindrical lens carried by said chassis and positioned parallel to said data lines, said lens having a focal length such, and being so positioned, as to focus said data lines upon said detector, and
  at least one second cylindrical lens carried by said chassis and positioned parallel to said strip and transverse to said first lens, said second lens having a focal length such, and being so positioned, as to focus said data lines on said detector,
  whereby said data lines are scanned in sequence over their lengths as said chassis is moved along said data strip.

23. A reader as set forth in claim 22 including means for synchronizing the rate of movement of said chassis with the rate of movement of said second lens.

24. A reader as set forth in claim 23 in which said rate of movement is such that each data line is scanned a plurality of times, and including means for selecting and utilizing the scanned data from only one of said plurality of scans of each said data line.

25. A reader as set forth in claim 22 in which said chassis positioning means includes a reader housing with an opening therein adapted to be positioned over said data strip, and rails mounted within said housing for supporting said chassis during its said longitudinal movement along said data strip.

26. A reader as set forth in claim 23 in which said synchronizing means includes gear teeth positioned on one of said rails and a gear train coupling said teeth with said means for moving said second lens.

27. A reader as set forth in claim 23 in which the rate of movement of said second said lens is sufficiently greater than that of said first said lens such that each data line is scanned a plurality of times before an adjacent data line is scanned.

28. A reader as set forth in claim 22 including means on said chassis for adjusting the angle of said first cylindrical lens relative to said data lines to cause said first lens to be parallel to said data lines.

29. A reader as set forth in claim 28 in which said angle adjusting means includes pivotally mounting said first lens on said chassis for rotation about an axis perpendicular to the plane of said data strip and means for rotating said first lens about said axis,
said latter means including a reversible motor and an operatively associated gear wheel mounted on said chassis, spiral grooves in said gear wheel, and a pivoted linkage on said chassis operatively connected to said grooves and connected to said first lens,
whereby actuation of said motor will rotate said first lens about its said axis and thereby adjust the alignment of said lens and said data line.

30. A reader as set forth in claim 29 which said first lens is carried by a supporting frame providing said pivotal mounting to said chassis and including a light source carried by said supporting frame,
whereby said first lens and said light source can both be adjustably aligned with said data line.

31. In an optical scanner for reading a data strip having contiguous, conterminous, parallel data lines of encoded bits and having a chassis adapted to be positioned over said data strip, a lower cylindrical lens carried by said chassis parallel to said data lines when said chassis is positioned over said data strip, a plurality of upper cylindrical lenses transverse to said lower lens and mounted on said chassis on a drum for rotational movement, and a detector at the focal point of said upper and lower lenses, that improvement including,
positional timing means,
said positional timing means including a position light source and a position light detector secured to said chassis on opposite sides of said drum, a chopper on said drum for each said upper lens and secured to said drum in a pre-determined position with respect to its respective said upper lens, said choppers being positioned to interrupt light passing from said position light source to said detector,
whereby said position detector will produce signals corresponding to the positions of said upper lenses.

32. In an optical scanner as set forth in claim 31, the improvement including drum rotation-rate timing means,
said rotation-rate timing means including a timing light source and a rotation-rate timing detector mounted on said chassis on opposite sides of said drum, equallyspaced radial timing lines on said drum, a moire screen complementary to said timing lines mounted on said chassis proximate to a portion of said timing lines, said timing lines and said screen being in the light path between said timing light source and said timing detector,
whereby said timing detector will produce signals corresponding to the rotational speed of said drum and thereby corresponding to the scanning rate of said upper lenses.

33. In an optical scanner as set forth in claim 32, the improvement in which said position light source and said timing light source are a single LED.

34. In an optical scanner as set forth in claim 32, the improvement in which said timing lines are molded of clear plastic in the configuration of a plurality of convex lenses having focal lengths that will focus said timing light source on said screen.

35. In an optical scanner as set forth in claim 32, the improvement in which said timing lines are molded of clear plastic in the configuration of a plurality of convex lenses having focal lengths that will focus said detector on said screen.

36. In an optical scanner for reading a data strip having parallel data lines of encoded bits and having a chassis adapted to be positioned over said data strip, a lower cylindrical lens carried by said chassis parallel to said data lines when said chassis is positioned over said data strip, a plurality of upper cylindrical lenses transverse to said lower lens and mounted on said chassis on a drum for rotational movement, and a detector at the focus of said upper and lower lenses, that improvement including,
drum rotation-rate timing means including a timing light source and a rotation-rate timing detector mounted on said chassis on opposite sides of said drum, equally-spaced radial timing lines on said drum, said timing lines being in the light path between said timing light source and said timing detector,
whereby said timing detector will produce signals corresponding to the rotational speed of said drum and thereby corresponding to the scanning rate of said upper lenses.

37. In an optical scanner as set forth in claim 36 the improvement including a moire screen complementary to said timing lines and mounted on said chassis proximate to a portion of said timing lines, said screen being in the light path between said timing light source and said timing detector.

38. In an optical scanner as set forth in claim 37, the improvement in which said timing lines are molded of clear plastic in the configuration of a plurality of convex lenses.

39. In an optical scanner as set forth in claim 38, the improvement in which said convex lenses have a focal length that will focus said timing light source on said screen.

40. In an optical scanner utilizing the principle of transversely crossed cylindrical lenses moving relative to one another to determine point focus for reading parallel data lines of data bits from a data strip on a substrate and including a chassis carrying a data bit detector and at least one upper cylindrical lens so positioned on said chassis that is perpendicular to said data lines when said chassis is positioned to read said data strip, said upper lens being mounted for movement in an arcuate line longitudinally of said data lines, the improvement including,
a supporting frame secured to said chassis,
a lower cylindrical lens carried by said frame, said lower lens being substantially parallel to, but concave with respect to, said data lines to focus said data bits on said detector, and
a field flattener carried by said frame proximate to said lower lens and configured to vary the focus of said upper lens over the length of said data line to compensate for varying distances of said upper lens from said data line and maintain said data bits in focus on said detector, whereby both said upper and said lower lenses focus said data bits of said data lines on said detector as the length of said data lines is scanned by said lenses.

41. In an optical scanner as set forth in claim 40 the improvement in which the lower surface of said field flattener is formed in the shape of a portion of a toroid.

42. In an optical scanner as set forth in claim 40 the improvement in which said field flattener has a longer focal length at its ends than at its center.

43. In an optical scanner as set forth in claim 40 the improvement in which said lower lens and said field flattener are molded as an integral transparent plastic unit.

44. In an optical scanner as set forth in claim 40 the improvement including having said supporting frame secured to said chassis for pivotal movement about an axis perpendicular to said substrate and having means to rotate said frame relative to said chassis to align said lower lens to be parallel with said data lines.

45. In an optical scanner as set forth in claim 40 the improvement including a light source and an associated light pipe mounted on said frame in a position to illuminate the said data line being scanned.

46. In an apparatus for scanning data encoded in bit form on a substrate in a plurality of contiguous, conterminous, parallel data lines of uniform width and length, said data lines together forming a data strip having a longitudinal dimension perpendicular to said data lines, and said apparatus including means for sequentially scanning said data lines at a pre-determined rate along the lengths thereof and for moving said scanning means longitudinally of said data strip during scanning, that improvement including, means for synchronizing the scanning rate of said data lines with the rate of longitudinal movement of said scanning means, said synchronizing means providing relative rates of movement of scanning said data lines and movement of said scanning means such that each said data line is scanned a plurality of times, and means for utilizing the data from only one of the scannings of each said data line.

47. In an apparatus as set forth in claim 46, that improvement including said data line scanning means being dimensioned to scan an area having a width less than the width of said data line.

48. A method of reading data encoded in bit form on a data strip, said data strip having a plurality of data lines formed of bit areas running transversely across said strip, said bit areas being of uniform width and length, and said data lines being parallel and contiguous to each other, the beginning of said data lines lying on a common line, whereby the totality of the widths of said data lines defines the longitudinal dimension of said data strip, said bit areas being encoded by printing and said encoding being in a known and predetermined sequence, said method of reading including the steps of, detecting printing in said bit areas in said data lines by spot scanning said data lines one at a time sequentially along the length of said data lines, the width of said scanning spot being less than the width of said data lines, and continuously moving the scanning spot longitudinally along the length of said data strip, said data line scanning being at a speed sufficiently greater than said longitudinal movement of said scanning spot such that each said data line is scanned a plurality of times over its length, and different portions of said encoded bit areas in said data lines are scanned, before the next contiguous said data line is scanned, and selecting and utilizing one of said scannings of each said data line.

49. The method of claim 48 in which said bit areas are encoded sequentially along each said data line and thereafter sequentially along the next sequential and contiguous said data line.

50. The method of claim 48 including the step of testing the detected bit areas from each scanning of each said data line for accuracy and prior to selecting and utilizing only said one of said scannings.

51. The method of claim 48 including the steps of utilizing dibits and dual parity check means in each said data line and of utilizing said parity check means to correct data utilized from inaccurately scanned said data lines.

52. The method of claim 48 including the steps of measuring and adjusting the angle of scanning relative to the position of said data lines, during scanning, and maintaining said scanning parallel to said data lines.

53. A method of reading data encoded in bit form on a longitudinal data strip, said data strip including:

(a) an information area including a plurality of contiguous, conterminous data lines of encoded data bits running transversely across said strip, said data lines being of equal length and parallel to each other, whereby the totality of said lines defines the length of said information area of said data strip, said encoded data being encoded in a known and predetermined sequence, said information area being preceded longitudinally of said strip by (b) a lead-in portion including (1) a horizontal synchronization section with longitudinal bars having ends transverse to said data strip and encoding information as to the number of bits in each said data line and (2) a vertical synchronization section encoding information as to the height of said bits in said data lines, and (c) alignment guidelines along opposite ends of said data lines, said guidelines being parallel to the longitudinal dimension of said data strip and having patterned configurations aligned with said data lines, said method including the steps of (a) scanning said horizontal synchronization section generally transversely of said strip while moving said data strip transversely to said scanning direction, determining from said scanning the angle, if any, between said data lines and said direction of scanning and adjusting the angle of said scanning to reduce said angle.

(b) scanning said vertical synchronization section to determine the height of said bits in said data lines, and (c) detecting the bits in said data lines by scanning said data lines one at a time and sequentially along the length thereof and simultaneously scanning said data lines transversely to their length, said scanning along said data line length being at a speed sufficiently greater than said transverse scanning such that each data line is scanned a plurality of times in its transverse direction before an adjacent data line is scanned, and selecting only one of said scannings of each said data line.

54. The method of claim 53 including the step of determining the number of bits in each data line from said scanning of said horizontal synchronization section.

55. The method of claim 53 including the step of adjusting the angle of scanning of the data lines, during scanning, by comparing said patterned configurations on said alignment guidelines, and adjusting the scanning angle to maintain said scanning parallel to said data lines.

56. The method of claim 53 in which said encoded data is sequentially encoded along each said data line and thereafter along the adjacent said data line.

57. The method of storing and retrieving data which comprises:
forming a data strip encoded with data elements, each element being in the form of a pair of optically distinguishable bits, said elements being disposed across the width of said data strip in a plurality of contiguous lines, the encoded data being encoded in a predetermined sequence;
including in each data line at least one parity checking element designating the information content of said data line;
providing a first tilt adjustment figure along one edge of said strip and a second tilt adjustment figure along the other edge of said strip;
scanning said data strip in a direction from its start end to its finish end, each data line being scanned sequentially across said strip to retrieve data encoded therein, and
perceiving the presence or absence of tilt from the relative relationships of said first and second tilt adjustment figures on each of said scans.

58. The method of claim 57 wherein two parity checking elements are included in each data line, each of said elements representing the values of alternate data bits along said line.

59. The method of claim 58 which includes:
establishing a threshold signal level for each data bit; and
altering the perceived state of any data bit having a signal level below the threshold in the absence of a parity check.

60. The method of claim 57 wherein the outputs from said first and second tilt adjustment figures are cyclical and wherein the presence and degree of tilt is determined from the phase relationship between the cyclical outputs.

61. The method of claim 60 wherein one of said cyclical outputs bears a known relationship to the centers of said data lines and includes the step of predicting the centers of successive data lines from said known relationship.

62. The method of claim 57 wherein said data strip generates a cyclical output which bears a known relationship to the centers of said data lines and includes the step of predicting the centers of successive data lines from said known relationship.

63. The method of claim 62 wherein said cyclical output is generated by one of said first and second tilt adjustment figures.

64. The method of claim 57 comprising the additional steps of:
determining the edges of optically distinguishable bits along a data line; and
reading data from portions of said bits substantially intermediate said edges.

65. The method of claim 64 wherein edge determination is obtained by centering filters.

66. The method of claim 57 including the steps of:
providing in the start end of said data strip a plurality of optically distinguishable elements equally disposed on both sides of the centerline of said strip and having colinear edges disposed transversely across said strip;
determining the number of said elements distinguishable on each side of the centerline in the region of said colinear edges during an initial scanning period and
making a coarse tilt adjustment in the angle of scan to equalize substantially the number of elements distinguishable on each side of said centerline.

67. The method of claim 66 comprising:
encoding in the number of elements in said start end of said strip, information pertaining to the number of bits in said data lines.

68. The method of claim 66 comprising:
measuring illumination intensities from a plurality of locations on the data strip base;
measuring illumination intensities from a plurality of locations on said elements; and
determining the intensity difference to establish data recognition parameters.

69. The method of claim 57 including the steps of:
predicting a starting point for scanning each data line;
establishing a counter having preselected count values based upon the data format of said data lines
scanning each data line beginning at its predicted starting point; and
utilizing the counter output to determine incremental positions along each data line.

70. The method of claim 57 including the step of:
providing in the start end of said data strip a plurality of optically distinguishable elements having encoded therein the height of the data elements in said data lines.

* * * * *